United States Patent
Hsu et al.

(10) Patent No.: US 12,208,575 B2
(45) Date of Patent: Jan. 28, 2025

(54) LASER SURFACE HEALING SYSTEMS AND METHODS

(71) Applicants: Keng Hsu, Tempe, AZ (US); Pu Han, Gilbert, AZ (US)

(72) Inventors: Keng Hsu, Tempe, AZ (US); Pu Han, Gilbert, AZ (US)

(73) Assignees: ARIZONA BOARD OF REGENTS ON BEHALF OF ARIZONA STATE, Scottsdale, AZ (US); Arizona State University, Scottsdale, AZ (US)

( * ) Notice: Subject to any disclaimer, the term of this patent is extended or adjusted under 35 U.S.C. 154(b) by 113 days.

(21) Appl. No.: 18/306,627

(22) Filed: Apr. 25, 2023

(65) Prior Publication Data

US 2023/0347589 A1 Nov. 2, 2023

Related U.S. Application Data

(60) Provisional application No. 63/363,690, filed on Apr. 27, 2022.

(51) Int. Cl.
| | |
|---|---|
| *B29C 64/118* | (2017.01) |
| *B23K 26/08* | (2014.01) |
| *B23K 26/10* | (2006.01) |
| *B29C 64/188* | (2017.01) |
| *B29C 64/209* | (2017.01) |
| *B29C 64/264* | (2017.01) |
| *B29C 64/268* | (2017.01) |
| *B29C 64/273* | (2017.01) |
| *B29C 64/277* | (2017.01) |

(Continued)

(52) U.S. Cl.
CPC ........ *B29C 64/188* (2017.08); *B23K 26/0884* (2013.01); *B23K 26/103* (2013.01); *B29C 64/393* (2017.08); *B33Y 10/00* (2014.12); *B33Y 30/00* (2014.12); *B33Y 40/20* (2020.01); *B33Y 50/02* (2014.12); *B29C 64/118* (2017.08)

(58) Field of Classification Search
CPC . B23K 26/0884; B23K 26/103; B29C 64/118; B29C 64/209; B29C 64/264; B29C 64/268; B29C 64/273; B29C 64/277; B29C 64/295; B29C 64/386; B29C 64/393; B33Y 10/00; B33Y 30/00; B33Y 50/00; B33Y 50/02; G05B 19/4099
USPC ............. 264/308, 494; 425/135, 174.4, 375; 219/121.78, 121.79, 121.8, 121.85
See application file for complete search history.

(56) References Cited

U.S. PATENT DOCUMENTS

| | | | |
|---|---|---|---|
| 10,710,353 B2 | 7/2020 | Hsu | |
| 2009/0267269 A1* | 10/2009 | Lim | B29C 64/112 425/174.4 X |

(Continued)

FOREIGN PATENT DOCUMENTS

| | | | | |
|---|---|---|---|---|
| CN | 105291442 A | * | 2/2016 | ........... B29C 64/118 |
| CN | 107336435 A | * | 11/2017 | ........... B29C 64/118 |

OTHER PUBLICATIONS

Translation of CN 105291442 A (published on Feb. 3, 2016).*

(Continued)

*Primary Examiner* — Leo B Tentoni
(74) *Attorney, Agent, or Firm* — SNELL & WILMER L.L.P.

(57) ABSTRACT

Exemplary systems and methods utilize laser heating to improve the surface finish, dimensional tolerance, and material strength of objects constructed via fused filament fabrication.

13 Claims, 27 Drawing Sheets

(51) Int. Cl.
  B29C 64/295   (2017.01)
  B29C 64/393   (2017.01)
  B33Y 10/00    (2015.01)
  B33Y 30/00    (2015.01)
  B33Y 40/20    (2020.01)
  B33Y 50/02    (2015.01)
  G05B 19/4099  (2006.01)

(56) References Cited

U.S. PATENT DOCUMENTS

2017/0066193 A1* 3/2017 Kim ............... B29C 64/118
2020/0262153 A1* 8/2020 Arao .............. B29C 64/118

OTHER PUBLICATIONS

Translation of CN 107336435 A (published on Nov. 10, 2017).*
Daminabo, S.C. et al., Fused deposition modeling-based additive manufacturing (3D printing): techniques for polymer material systems, Mater. Today Chem. 16 (2020) 100248.
Wu, H. et al., Recent developments in polymers/polymer nanocomposites for additive manufacturing, Prog. Mater. Sci. 111 (2020) 100638.
Gonzàlez-Henríquez, C.M. et al., Polymers for additive manufacturing and 4D-printing: Materials, methodologies, and biomedical applications, Prog. Polym. Sci. 94 (2019) 57-116.
Spoerk, M. et al., Material extrusion-based additive manufacturing of polypropylene: A review on how to improve dimensional inaccuracy and warpage, J. Appl. Polym. Sci. 137 (2020) 48545.
Brenken, B. et al., Fused filament fabrication of fiber-reinforced polymers: A review, Addit. Manuf. 21 (2018) 1-16.
Blok, L.G. et al., An investigation into 3D printing of fibre reinforced thermoplastic composites, Addit. Manuf. 22 (2018) 176-186.
Gao, X. et al. Fused filament fabrication of polymer materials: A review of interlayer bond, Addit. Manuf. 37 (2021) 101658.
Li, L. et al. Composite modeling and analysis for fabrication of FDM prototypes with locally controlled properties, J. Manuf. Process. 4 (2002) 129-141.
Verstraete, G. et al., 3D printing of high drug loaded dosage forms using thermoplastic polyurethanes, Int. J. Pharm. 536 (2018) 318-325.
Chen, X. et al., 3D printed porous PLA/nHA composite scaffolds with enhanced osteogenesis and osteoconductivity in vivo for bone regeneration, Biomed. Mater. 14 (2019) 65003.
Masood, S.H. et al., Development of new metal/polymer materials for rapid tooling using fused deposition modelling, Mater. Des. 25 (2004) 587-594.
Christ, J.F. et al., 3D printed highly elastic strain sensors of multiwalled carbon nanotube/thermoplastic polyurethane nanocomposites, Mater. Des. 131 (2017) 394-401.
Rigotti, D. et al., 3D printable thermoplastic polyurethane blends with thermal energy storage/release capabilities, Mater. Today Commun. 15 (2018) 228-235.
Nelson, M.D. et al., Flexible, transparent, sub-100 μm microfluidic channels with fused deposition modeling 3D-printed thermoplastic polyurethane, J. Micromechanics Microengineering. 29 (2019) 95010.
Turner, B.N. et al., A review of melt extrusion additive manufacturing processes: I. Process design and modeling, Rapid Prototyp. J. 20 (2014) 192-204.
Hill, N. et al., Deposition direction-dependent failure criteria for fused deposition modeling polycarbonate, Rapid Prototyp. J. 20 (2014) 221-227.
Drummer, D. et al., Suitability of PLA/TCP for fused deposition modeling, Rapid Prototyp. J. 18 (2012) 500-507.
Anitha, R. et al., Critical parameters influencing the quality of prototypes in fused deposition modelling, J. Mater. Process. Technol. 118 (2001) 385-388.
Tofangchi, A. et al., Effect of Ultrasonic Vibration on Interlayer Adhesion in Fused Filament Fabrication 3D Printed ABS, Polymers (Basel). 11 (2019) 315.
Han, P. et al., Relaxation of residual stress in fused filament fabrication part with in-process laser heating, Procedia Manuf. 53 (2021) 466-471.
Song, S. et al., Shape deviation modeling for fused deposition modeling processes, in: 2014 IEEE Int. Conf. Autom. Sci. Eng., IEEE, 2014: pp. 758-763.
Huang, Q. et al., Predictive modeling of geometric deviations of 3d printed products—a unified modeling approach for cylindrical and polygon shapes, in: 2014 IEEE Int. Conf. Autom. Sci. Eng., IEEE, 2014: pp. 25-30.
Huang, Q. et al., Optimal offline compensation of shape shrinkage for three-dimensional printing processes, Iie Trans. 47 (2015) 431-441.
Jin, Y. et al., A parallel-based path generation method for fused deposition modeling, Int. J. Adv. Manuf. Technol. 77 (2015) 927-937.
Vijayaraghavan, V. et al., Process characterisation of 3D-printed FDM components using improved evolutionary computational approach, Int. J. Adv. Manuf. Technol. 78 (2015) 781-793.
Zhu, Z. et al., Investigation of part distortions as a result of hybrid manufacturing, Robot. Comput. Integr. Manuf. 37 (2016) 23-32.
Lee, W. et al., Development of a hybrid rapid prototyping system using low-cost fused deposition modeling and five-axis machining, J. Mater. Process. Technol. 214 (2014) 2366-2374.
Pandey, P.M. et al., Improvement of surface finish by staircase machining in fused deposition modeling, J. Mater. Process. Technol. 132 (2003) 323-331.
Ahn, D. et al., Surface roughness prediction using measured data and interpolation in layered manufacturing, J. Mater. Process. Technol. 209 (2009) 664-671.
Ahn, D. et al., Representation of surface roughness in fused deposition modeling, J. Mater. Process. Technol. 209 (2009) 5593-5600.
Rahmati, S. et al., Evaluation of analytical modeling for improvement of surface roughness of FDM test part using measurement results, Int. J. Adv. Manuf. Technol. 79 (2015) 823-829.
Boschetto, A. et al., Triangular mesh offset aiming to enhance Fused Deposition Modeling accuracy, Int. J. Adv. Manuf. Technol. 80 (2015) 99-111.
Galantucci, L.M. et al., Quantitative analysis of a chemical treatment to reduce roughness of parts fabricated using fused deposition modeling, CIRP Ann. 59 (2010) 247-250.
Galantucci, L.M. et al., Experimental study aiming to enhance the surface finish of fused deposition modeled parts, CIRP Ann. 58 (2009) 189-192.
Lavecchia, F. et al., Chemical vapor treatment to improve surface finish of 3D printed polylactic acid (PLA) parts realized by fused filament fabrication, Prog. Addit. Manuf. (2021) 1-11.
Ukar, E. et al., Laser polishing of tool steel with CO2 laser and high-power diode laser, Int. J. Mach. Tools Manuf. 50 (2010) 115-125.
Gisario, A. et al., Surface reconstruction of porous substrates in sintered bronze by cw-high power diode laser, Opt. Lasers Eng. 50 (2012) 1306-1315.
Chang, C.-S. et al., Influence of laser beam fluence on surface quality, microstructure, mechanical properties, and tribological results for laser polishing of SKD61 tool steel, J. Mater. Process. Technol. 229 (2016) 22-35.
Campanelli, S.L. et al., Taguchi optimization of the surface finish obtained by laser ablation on selective laser molten steel parts, Procedia CIRP. 12 (2013) 462-467.
Taufik, M. et al., Laser assisted finishing process for improved surface finish of fused deposition modelled parts, J. Manuf. Process. 30 (2017) 161-177.
Chai, Y. et al., Laser polishing of thermoplastics fabricated using fused deposition modelling., Int. J. Adv. Manuf. Technol. 96 (2018).
Lambiase, F. et al., Laser finishing of 3D printed parts produced by material extrusion, Opt. Lasers Eng. 124 (2020) 105801.
Han, P. et al., Effect of in-process laser interface heating on strength isotropy of extrusion-based additively manufactured PEEK, Procedia Manuf. 48 (2020) 737-742.
Han, P. et al., An approach to improve interface healing in FFF-3D printed Ultem 1010 using laser pre-deposition heating, Procedia Manuf. 34 (2019) 672-677.

(56) References Cited

OTHER PUBLICATIONS

Mcilroy, C. et al., Deformation of an amorphous polymer during the fused-filament-fabrication method for additive manufacturing, J. Rheol. (N. Y. N. Y). 61 (2017) 379-397.

Ezekoye, O.A. et al., Polymer weld strength predictions using a thermal and polymer chain diffusion analysis, Polym. Eng. Sci. 38 (1998) 976-991.

Harris, C.G. et al., Additive Manufacturing with Soft TPU—Adhesion Strength in Multimaterial Flexible Joints. Front Mech Eng 2019;5:37.

Wang, Y. et al., Bending performance enhancement by nanoparticles for FFF 3D printed nylon and nylon/Kevlar composites. J Compos Mater 2020:0021998320963524.

Rafiee, M. et al., Multi-material 3D and 4D printing: a survey. Advanced Science 2020;7:1902307.

Snijkers, F. et al., Perspectives on the viscoelasticity and flow behavior of entangled linear and branched polymers. Journal of Physics: Condensed Matter 2015;27:473002.

Spoerk, M. et al., Parametric optimization of intra-and inter-layer strengths in parts produced by extrusion-based additive manufacturing of poly (lactic acid). J Appl Polym Sci 2017;134:45401.

Aliheidari, N. et al., Fracture resistance measurement of fused deposition modeling 3D printed polymers. Polym Test 2017;60:94-101.

Aliheidari, N. et al., Interlayer adhesion and fracture resistance of polymers printed through melt extrusion additive manufacturing process. Mater Des 2018;156:351-61.

Davis, C.S. et al., Mechanical strength of welding zones produced by polymer extrusion additive manufacturing. Addit Manuf 2017;16:162-6.

Spoerk, M. et al., Polypropylene filled with glass spheres in extrusion-based additive manufacturing: effect of filler size and printing chamber temperature. Macromol Mater Eng 2018;303:1800179.

Yin, J. et al., Interfacial bonding during multi-material fused deposition modeling (FDM) process due to inter-molecular diffusion. Mater Des 2018;150:104-12.

Srinivas, V. et al., Correlating molecular and crystallization dynamics to macroscopic fusion and thermodynamic stability in fused deposition modeling; a model study on polylactides. Polymer (Guildf) 2018;142:348-55.

Coogan, T.J. et al., Modeling of interlayer contact and contact pressure during fused filament fabrication. J Rheol (N Y N Y) 2019;63:655-72.

Chacón, J.M. et al., Additive manufacturing of PLA structures using fused deposition modelling: Effect of process parameters on mechanical properties and their optimal selection. Mater Des 2017;124:143-57.

Abbott, A.C. et al.. Process-structure property effects on ABS bond strength in fused filament fabrication, Addit. Manuf. 19 (2018) 29-38 n.d.

Puerta, A.P.V. et al., Fused deposition modelling interfacial and interlayer bonding in PLA post-processed parts. Rapid Prototyp J 2019.

Coasey, K. et al., Nonisothermal welding in fused filament fabrication. Addit Manuf 2020;33:101140.

Hart, K.R. et al., Increased fracture toughness of additively manufactured amorphous thermoplastics via thermal annealing. Polymer (Guildf) 2018;144:192-204.

Han, P. et al., In-process laser heating: A cost-efficient way to improve mechanical and geometrical properties for fused filament fabrication. TechConnect Briefs 2022; 2022:88-90.

Nugroho, A. et al., Effect of layer thickness on flexural properties of PLA (PolyLactid Acid) by 3D printing. J Phys Conf Ser, vol. 1130, IOP Publishing; 2018, p. 12017.

Mcilroy, C.O. PhD., Disentanglement effects on welding behaviour of polymer melts during the fused-filament-fabrication method for additive manufacturing. Polymer (Guildf) 2017;123:376-91.

Teixeira, S. et al., Towards Controlled Degradation of Poly (Lactic) Acid in Technical Applications. C (Basel) 2021;7:42.

\* cited by examiner

LASER SURFACE HEALING SYSTEMS AND METHODS

CROSS-REFERENCE TO RELATED APPLICATION

This application claims priority to and the benefit of U.S. Provisional Patent Application No. 63/363,690 filed Apr. 27, 2022, entitled "Laser Surface Healing Systems and Methods." The content of the foregoing application is hereby incorporated by reference (except for any subject matter disclaimers or disavowals, and except to the extent of any conflict with the disclosure of the present application, in which case the disclosure of the present application shall control). The present disclosure relates to fused filament fabrication, and particularly to fused filament fabrication approaches utilizing laser-based surface healing.

TECHNICAL FIELD

The present disclosure relates to fused filament fabrication, and particularly to fused filament fabrication approaches utilizing laser-based surface healing.

BACKGROUND

Currently, fused filament fabrication (FFF) processes suffer from poor surface finishes and reduced structural strength, which are limited by the layer-by-layer fabrication process itself. For example, layer thickness is usually 0.1 or 0.2 millimeters, resulting in a boundary between layers. Further, the cross-sectional shape of the extruded filament material is round, which results in a curved surface at the edge of the deposited track, giving the FFF 3D-printed object a wave-shape feature. Insufficient heating between deposited tracks during the extrusion process weakens the structural strength of the finished part. Accordingly, improved systems and methods for addressing these and other shortcomings of additive manufacturing systems remain desirable.

SUMMARY

In various embodiments, a 3D printing apparatus comprises a printing nozzle comprising a nozzle orifice, an input end, and a hot end; a focusing electromagnetic radiation source configured to orbit around the printing nozzle; a processor configured with instructions that, when executed by the processor, cause the focusing electromagnetic radiation source to orbit around the printing nozzle; and an orbiting mechanism coupled to the focusing electromagnetic radiation source, wherein the processor enables the orbiting mechanism to move the focusing electromagnetic radiation source in an orbital path around the printing nozzle.

In another exemplary embodiment, a non-contact heating device comprises a focusing electromagnetic radiation source; an orbiting mechanism, wherein the orbiting mechanism is configured to removably couple to a printing nozzle and move the electromagnetic radiation source in an orbital path around the printing nozzle; and a processor comprising instructions to orbit the focusing electromagnetic radiation source around the printing nozzle.

In another exemplary embodiment, a method of using at least one focusing electromagnetic radiation source to modify a 3D-printed material comprises providing a toolpath for a printing nozzle to follow; calculating vector angles of any given two adjacent points in the toolpath; using the calculated vector angles to rotate the at least one focusing electromagnetic radiation source around the printing nozzle; and directing radiation from the at least one focusing electromagnetic radiation source onto the 3D printed material.

The contents of this section are intended as a simplified introduction to the disclosure and are not intended to be used to limit the scope of any claim.

BRIEF DESCRIPTION OF THE DRAWINGS

With reference to the following description and accompanying drawings.

DETAILED DESCRIPTION

Figure 1A:
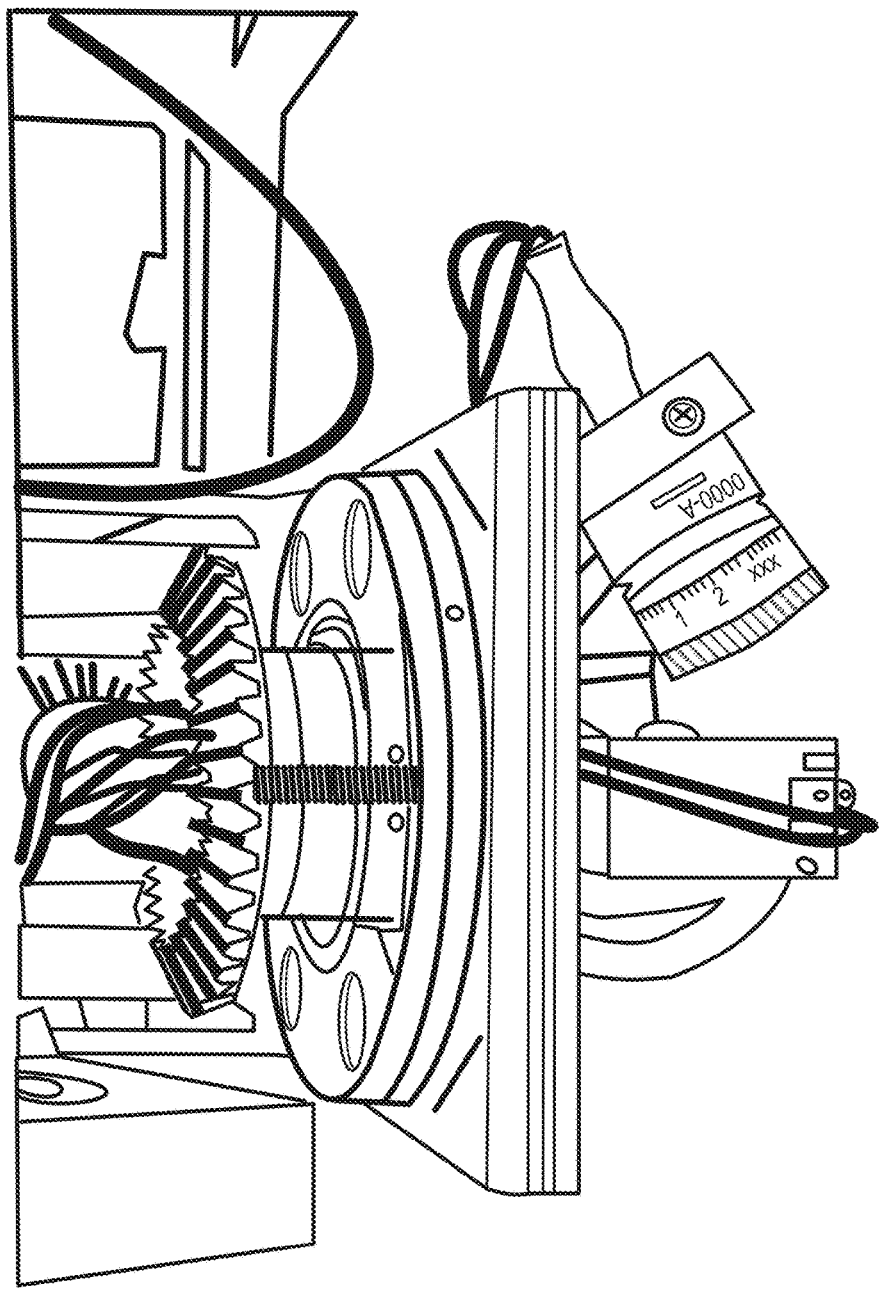
FIG. 1A illustrates a rotating laser healing apparatus in accordance with various exemplary embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for additive manufacturing, fused deposition modeling, laser energy generation and/or control, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical additive manufacturing system (for example, a Fused Deposition Modeling (FDM) system) utilizing laser heating and related methods of use.

Principles of the present disclosure contemplate additive manufacturing utilizing laser energy, for example, laser heating of a target area in connection with fused deposition modeling. In various exemplary embodiments, a focused laser beam is used to locally heat up a part surface during a Fused Deposition Modeling (FDM) three-dimensional printing process to enhance bonding between the filament exiting the FDM nozzle and the target surface. Through the enhancement in inter-filament bonding through this real-time local pre-heating process, the strength of an FDM part in the across-layer direction can be nearly identical to that in the along-filament directions. As used herein, "laser heating", "laser pre-heating", or similar terms may be used interchangeably to refer to use of a laser to increase the temperature of a substrate prior to deposition of an FDM filament.

Fused filament fabrication (FFF) is one of the most commonly used additive manufacturing processes for thermal plastic material. Additive manufacturing is a layer-by-layer fabrication process that builds objects using a digital 3D model. FFF is a commonly used additive manufacturing process because it is cost-effective. FFF comprises extruding thermoplastic filament through a heated nozzle through two rollers and depositing the thermoplastic filament on a build plate surface or a previously deposited layer on the build plate. These layers of thermoplastic filament are added repetitively to build a 3D object. The FFF process can be manipulated to tune the fabrication process. FFF is advantageous in building because a large number of printable filament materials can be used in the process, including multiple printable filament materials for one part (multi-material composition) and flexibility in the scale of fabrication. FFF can also be used to process medical parts. However, FFF may also have some disadvantages, including that the surface finish of the FFF printed part may be imperfect due to the mechanism of the extrusion-based layer-by-layer deposition process, and the mechanical strength of the FFF-built part may be lower than a conventionally made part. In this invention, an in-process orbiting laser-assisted surface healing method is described that is demonstrated to enhance surface reflow, significantly improve surface finish in the printed part, and increase structural strength. It is observed that the surface finish and strength of the printed part was drastically improved for both flat and curved surfaces.

The structural strength of FFF-built parts is lower than parts fabricated using a conventional method, such as blow molding, due to the mechanism of extrusion used by FFF. The mechanical strength of an FFF-built part is highly dominated by the degree of bonding between adjacent layers of filament. Where the temperature of the adjacent layers is not high enough to allow the adjacent layers to melt into each other, the mechanical strength of the FFF-built part is reduced.

To improve the strength of the bonding between each filament layer, a movement called "reptation" may be introduced to the process of 3D printing, wherein a printing nozzle is moved in a snake-like motion to heal the interface between layers. Increasing the reptation in the process increases the mechanical strength of the 3D printed part, where the relationship may be calculated with the following equation:

$$\frac{\sigma_t}{\sigma_{max}} = \left(\frac{t_{weld}}{\tau_{rep}}\right)^{1/4} = \left(\frac{t_{weld} D_s}{R_g^2}\right)^{1/4}$$

Wherein $\sigma_t$ and $\theta_{max}$ are the strength of the interface and the strength of the bulk material, respectively, $t_{weld}$ is the healing time of the interface (or time during which the interface stays above glass transition or melting temperature), $\tau_{rep}$ is the reptation time (time needed for polymer chains to reptate as far as $R_g$), $D_s$ is the center of mass diffusivity of polymer chains (a function of temperature), and $R_g$ is the radius of gyration of polymer chains.

The mechanical strength of the FFF-manufactured part is directly related to weld time and diffusivity of the material. Where the healing time ($t_{weld}$) exceeds the reptation time, the mechanical strength of the FFF part may be similar to the material of the extruded thermoplastic if it was in the form of a solid, bulk material.

Moreover, the friction between the thermoplastic material and the printing nozzle wall causes the polymer chains of the thermoplastic to become more disentangled and stretched, an effect that increases in magnitude the closer the polymer chains are to the printing nozzle wall. The printing nozzle friction impacts the strength of the FFF part because the highly disentangled and stretched polymer chains impacted by the friction form the outer surface of each deposited layer of filament. The polymer chains of the extruded thermoplastic may also become elongated due to imposed large deformations to the FFF part wherein the polymer radius of gyration ($R_g$) may increase significantly, leading to a decrease in the strength of the interface between the filament layers.

Various factors in the FFF process may increase the mechanical strength of the FFF-built part, including increasing the nozzle temperature or build plate temperature, and changing the print speed, layer thickness, weld time, or diffusivity of the filament material. However, optimizing these factors may not maximize the material strength of an FFF-built part for performance similar to a part manufactured using conventional methods. Annealing the FFF part may also increase its strength, but the annealing process may affect the shape of minor surface features on the part. Moreover, annealing adds a post-process step to the manufacture of the FFF part, decreasing efficiency and increasing costs.

To increase the strength of FFF parts, an in-process laser heating technique may be employed to improve inter-layer bonding and increase the strength of FFF-built parts to nearly isotropic tensile strength without impacting the shape of minor surface features and without a post-process step. Laser heating may be employed by coupling a laser on the printing nozzle in a fixed position while the printing nozzle extrudes filament, wherein the laser's relative position to the nozzle remains constant. In this fixed position, the laser can only work to heat the filament to increase the bonding strength when the printing nozzle is moving in one direction. A 3-dimensional part cannot achieve isotropic strength where the laser is only heating in one direction. Moreover, optical fiber may be used in the mechanism moving the printing nozzle to guide the laser, therefore the movement of optical fiber with the print head may result in different and inconsistent laser intensities during FFF printing.

To achieve isotropic strength, an orbiting laser heating process may be employed, wherein a laser is directed in front of the path of the printing nozzle to heat a layer of filament before the next layer of filament is extruded, then orbiting the printing nozzle to heat the filament layers. This process may improve inter-layer bonding in multiple directions. A diode laser may be installed on the print head of a 3D printing apparatus, which may achieve uniform intensity throughout the FFF process and thereby increase isotropic strength of the manufactured part. The laser may be configured to rotate to maintain the positioning of the laser relative to the nozzle path, wherein the laser is focused on the side of the part or on a filament layer to achieve improved surface finish or inter-layer bonding. Thus, the position of the laser on the nozzle path may be maintained despite the movement of the printing nozzle, which may improve surface finish and inter-layer bonding between layers of filament. The impact of an orbital laser heating device and laser heating method on mechanical strength, fracture strain, material deformation, fracture behavior, and side effects on a FFF part are herein presented.

Figure 1B:
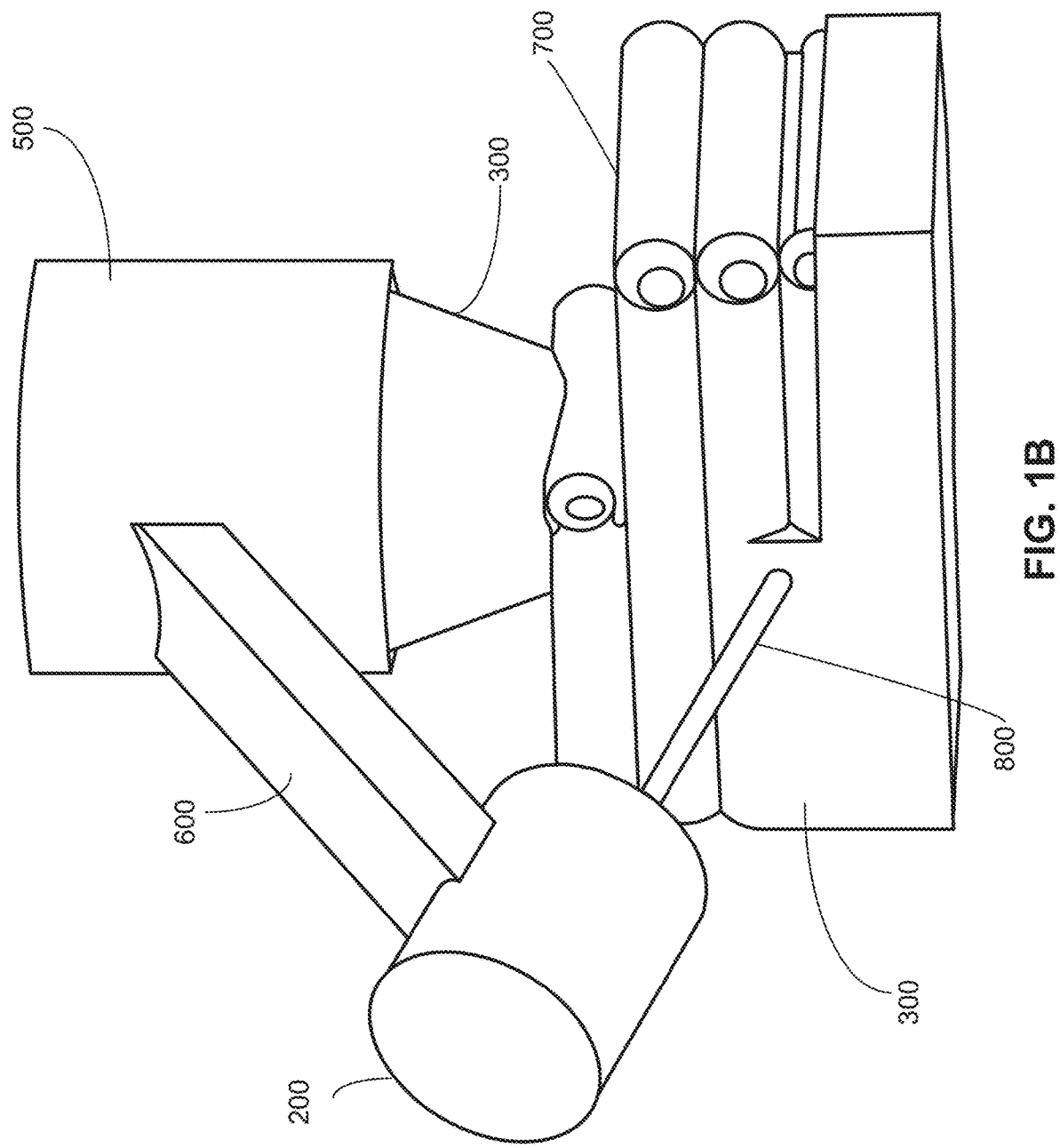
FIG. 1B illustrates a schematic diagram of the healing process in accordance with various exemplary embodiments.

With reference now to FIGS. 1A and 1B, a rotating laser surface healing apparatus 100 is illustrated. In various embodiments, a rotating laser surface healing apparatus 100 comprises a printing nozzle 400, which in turn comprises a nozzle orifice, an input end, and a hot end 500. A focusing electromagnetic radiation source 200, which may orbit around the printing nozzle 400, is coupled to the printing nozzle using a means for two-dimensional orbiting of the focusing electromagnetic radiation source around the printing nozzle, for example, a laser attachment arm 600. The printing nozzle 400 may be a customized Type A Machine 3D printer (a Type A Machine Series 1, San Francisco, US). The printing apparatus may comprise a Duet 2 Wi-Fi motherboard to add rotational control. A local area network may be established, enabling the printing nozzle 400 to be controlled through an internet browser. In various embodiments, the printing nozzle 400 further comprises an extruder head configured to facilitate an orbital focusing electromagnetic radiation source. In various embodiments, filament may be filled from the top of the printing nozzle using two metal rollers that guide the filament into a tube that is coupled to the hot end 500. The tube may be bundled with laser cables, heater cables, and thermistor cables, forming a cable bundle. The cable bundle may be configured to tighten and loosen during the rotation of the focusing electromagnetic radiation source 200, depending on the direction of the rotation. In various embodiments, to enable the rotation of the focusing electromagnetic radiation source, a stepper motor may be installed behind the wire bundles with a customized L-shape bracket coupled to the hot end 500. The stepper motor may rotate, wherein the hot end may be enabled to orbit from 0° to 360°. In various embodiments, an 808 nm diode laser may be installed on the hot end using a customized elbow shape holder to couple the laser to the hot end. In these embodiments, the hot end 500, the laser, and a brass gear are coupled to each other and orbit during the printing process.

In various embodiments, the focusing electromagnetic radiation source 200 may be used to heal a 3D-printed surface. In various embodiments, a toolpath for the printing nozzle 400 to follow may be provided. The vector angles of any two given adjacent points in the entire toolpath may be also calculated. The calculated vector angles may then be used to rotate the focusing electromagnetic radiation source 200 to an appropriate angle around the printing nozzle 400. A 3D-printed surface may then be targeted by the focusing electromagnetic radiation source 200. In various exemplary embodiments, a computer-aided drafting (CAD) model may be used to generate the toolpath for the printing nozzle 400 to follow. Thus, in various embodiments the focusing electromagnetic radiation source 200 is configured to maintain focus at a point on the extruded filament directly in front of the printing nozzle 400 relative to the concurrent direction of the printing nozzle's 400 movement.

In exemplary embodiments, the focusing electromagnetic radiation 200 source may be a laser. In various embodiments, the focusing electromagnetic radiation 200 source may emit light at a wavelength between 450 nanometers and 10,000 nanometers. In various exemplary embodiments, the means for orbiting the focusing electromagnetic radiation source around the printing nozzle may be a mechatronic controller.

In various embodiments, the filament 300 may be black polylactic acid filament. The printing nozzle 400 may be 0.8 mm in diameter. The print speed may be about 10 mm/s. In exemplary embodiments, the flexural strength and ductility of 3D printed materials may increase up to 55% when a method of laser healing between adjacent layers of filament is employed.

In various exemplary embodiments, a filament may be fed into the input end of the printing nozzle 400. In various exemplary embodiments, the printing nozzle 400 may further comprise a tube connecting the input end and the hot end 500. In exemplary embodiments, the tube may comprise two rollers which translate the filament along the length of the tube towards the hot end 500 of the printing nozzle 400. The tube may be made of Teflon. The tube may also be bundled with other cables, for example, cables for the laser, heater, and thermistor In various exemplary embodiments, an adjustable bracket may be movably coupled to the hot end 500 of the printing nozzle 400. In various exemplary embodiments, the focusing electromagnetic radiation source 200 may orbit about the printing nozzle 400 at any relative angle from 0 degrees to 360 degrees. In various embodiments, the focal point of the focusing electromagnetic radiation source 200 may be rectangular in shape. In various exemplary embodiments, the focal point may be 1 millimeter by 0.6 millimeters. In various embodiments, the focusing electromagnetic radiation 200 source may be focused at 0.6 millimeters below the printing nozzle 400.

In various embodiments, orbiting laser healing may be used to enhance interlayer adhesion by improving thermal reptation between layers deposited by a 3D printer. An orbiting laser assembly may be positioned to align with a layer of filament before the next layer is deposited by the nozzle. The heating of the layers prior to the placement of another layer increases interlayer bonding strength. The temperature at which each layer should be heated to attain the greatest interlayer strength may depend on the type of filament used to 3D print.

Figure 2:
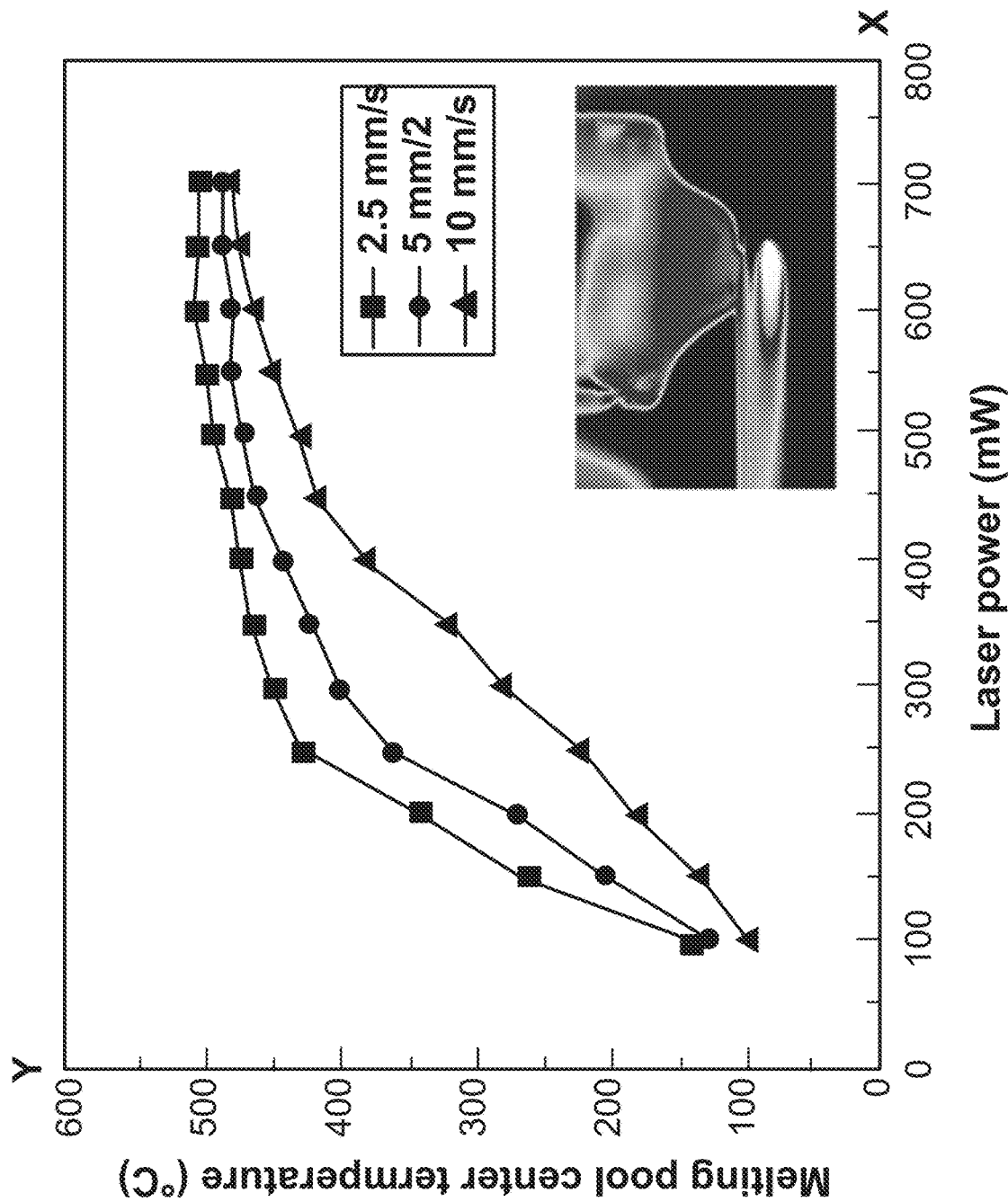
FIG. 2 illustrates the temperature profile of the melting pool at various laser powers and printing speeds in accordance with various exemplary embodiments.

With reference now to FIG. 2, the melting pool temperature of the center of the laser heated region may vary with laser power and printing speed. As shown in FIG. 2, temperature generally increases with laser power, from about 100° C. at 100 milliwatts of laser power to about 500° C. at about 700 milliwatts of laser power. Decreasing printing speed increases temperature relative to faster printing speeds.

Figure 3A:
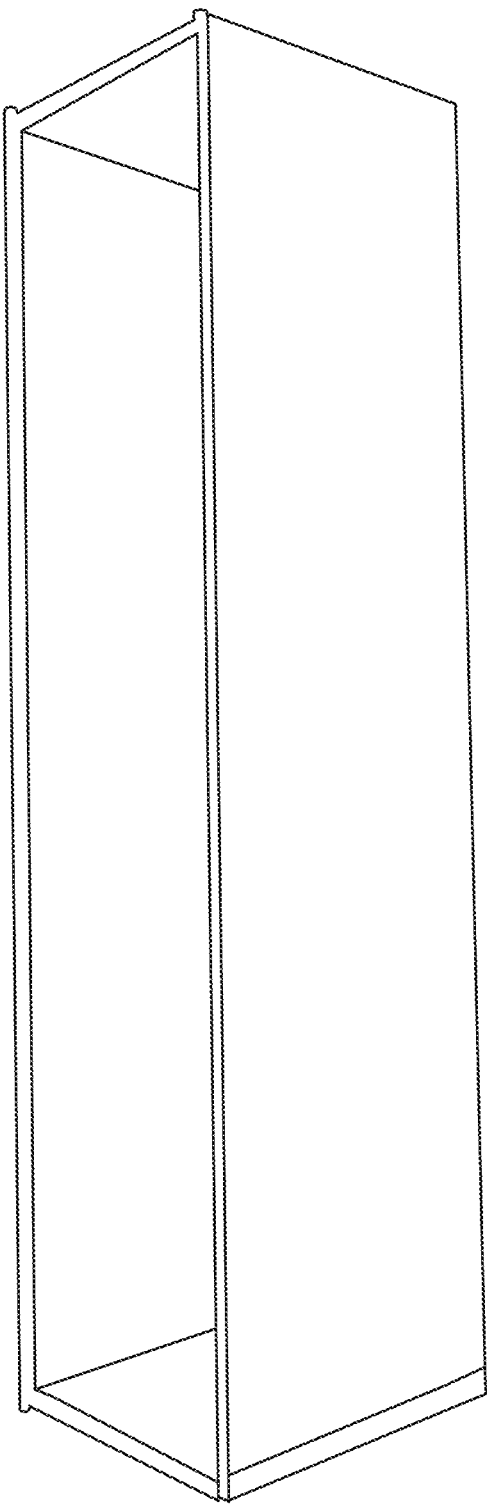
FIG. 3A illustrates a printed rectangular box without a top or bottom used in tensile tests in accordance with various exemplary embodiments.
Figure 3B:
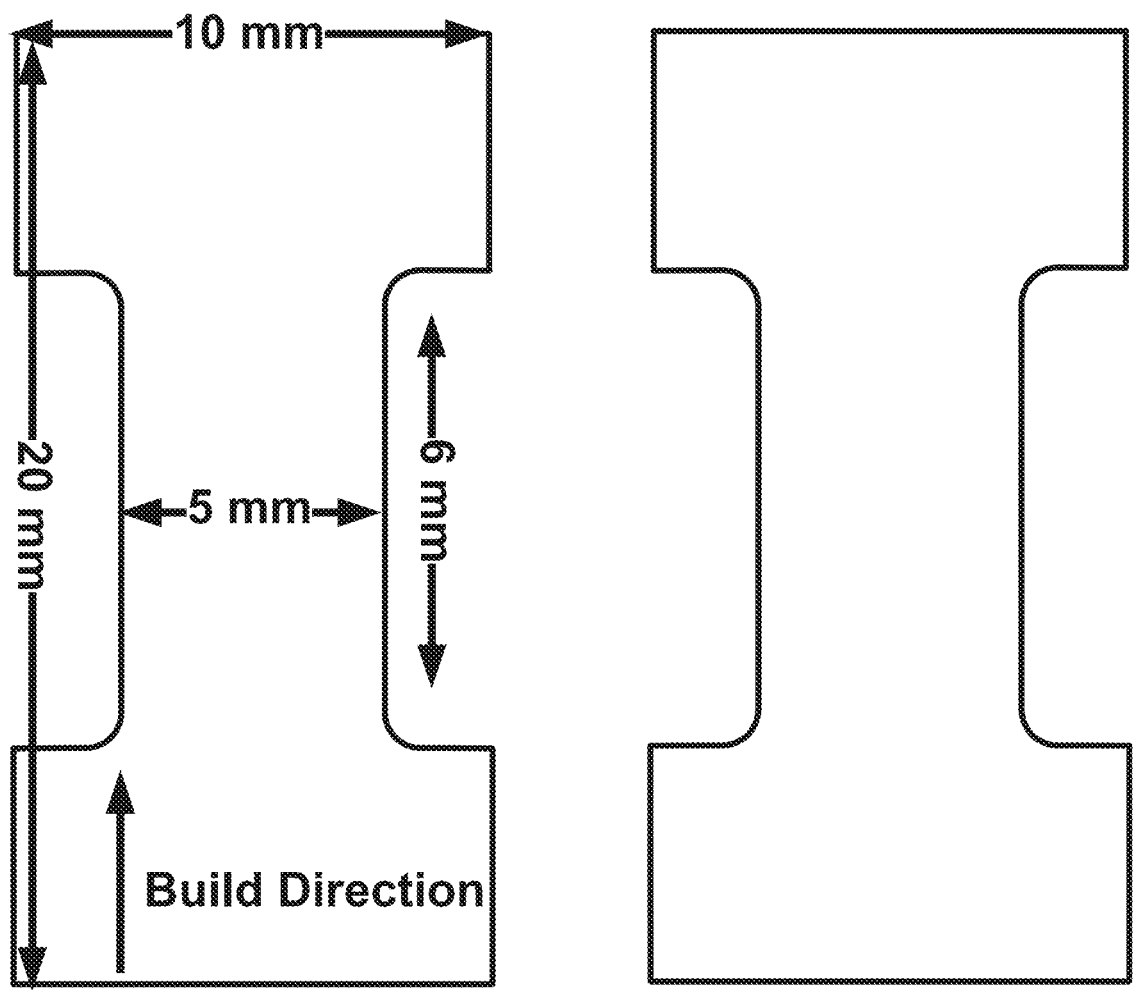
FIG. 3B illustrates milled tensile bars in accordance with various exemplary embodiments.

With reference now to FIGS. 3A and 3B, three groups of samples were prepared to characterize the apparatus. With reference now to FIG. 3A, firstly, surface roughness samples were prepared. Each sample may be a single wall rectangular box without top or bottom. In various embodiments, the size of the box may be 80 millimeters long, 20 millimeters wide, and 40 millimeters tall. In various embodiments, the layer height may be 0.2 millimeters, meaning the box is divided into 200 layers. Laser settings were varied after every tenth layer. With reference now to FIG. 3B, secondly, tensile test samples may be printed with a printing speed of 5 millimeters per second, with various laser powers. Laser powers were varied between 0 milliwatts and 700 milliwatts in 100 milliwatt intervals. Samples may be printed as single wall rectangular boxes without a top or a bottom. A desktop PCB milling machine may be used to mill five samples from the front wall using water cooling to avoid melting. The tensile bars may have dimensions as shown in FIG. 3B. Thirdly, a curved surface healing sample may be printed in the form of a custom hose adaptor.

Figure 4A:
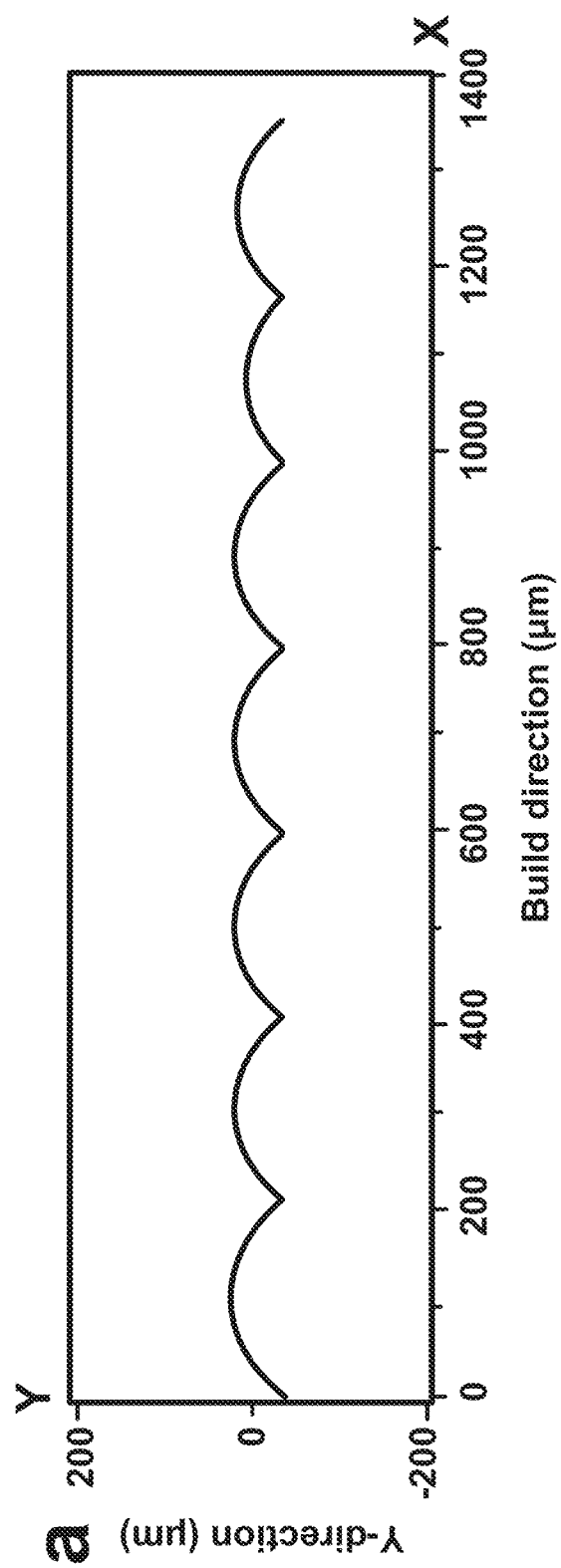
FIG. 4A illustrates profilometry data of a control sample in accordance with various exemplary embodiments.
Figure 4B:
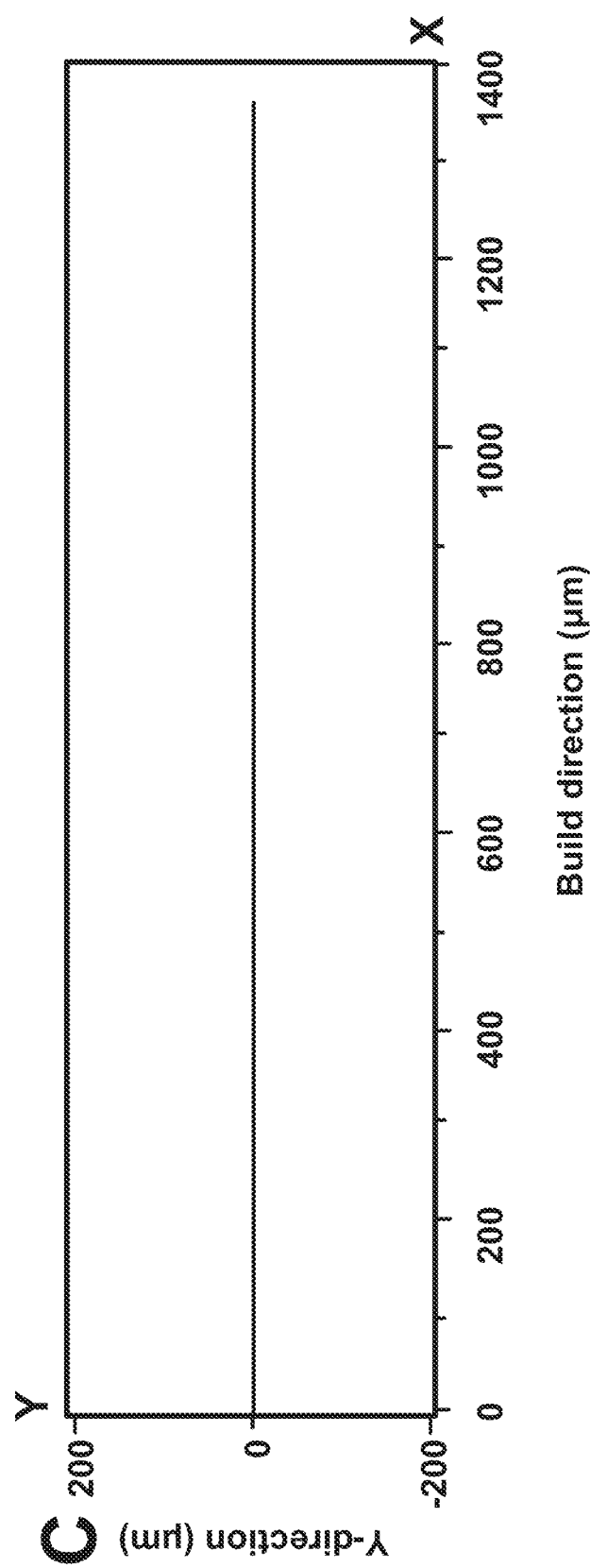
FIG. 4B illustrates profilometry data of a laser-treated sample in accordance with various exemplary embodiments.
Figure 4C:
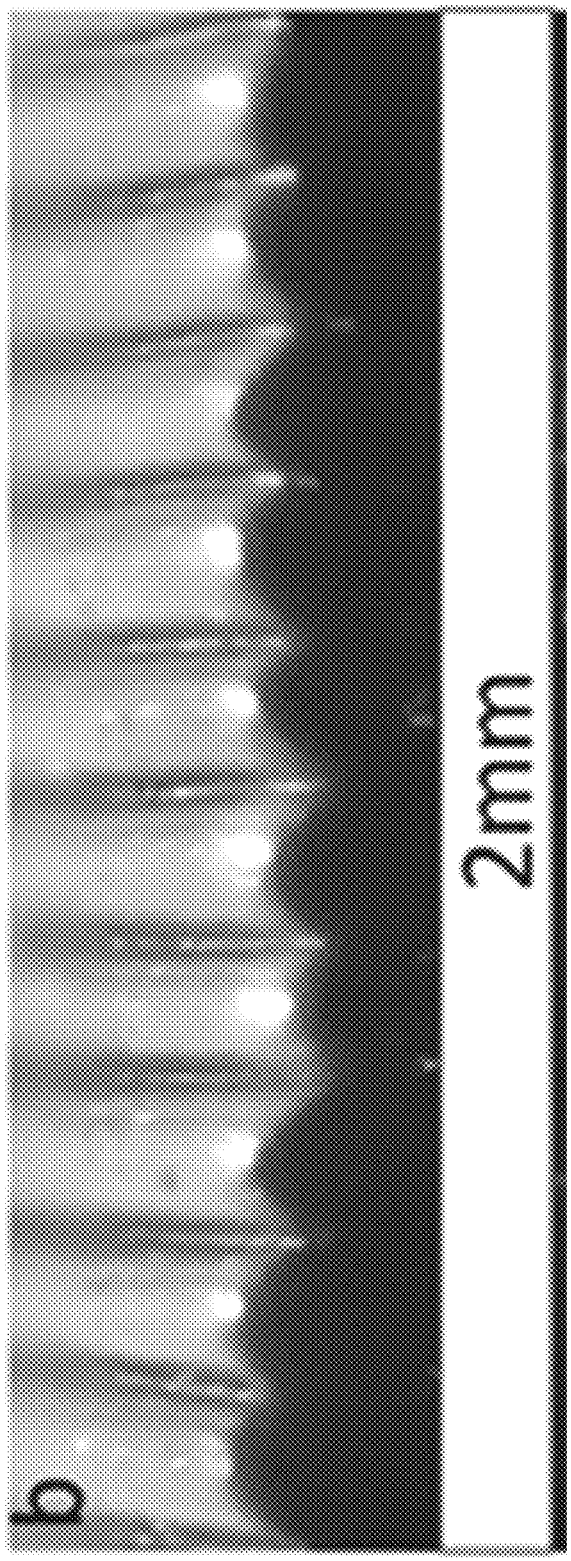
FIG. 4C illustrates a control sample surface, in accordance with various exemplary embodiments.
Figure 4D:
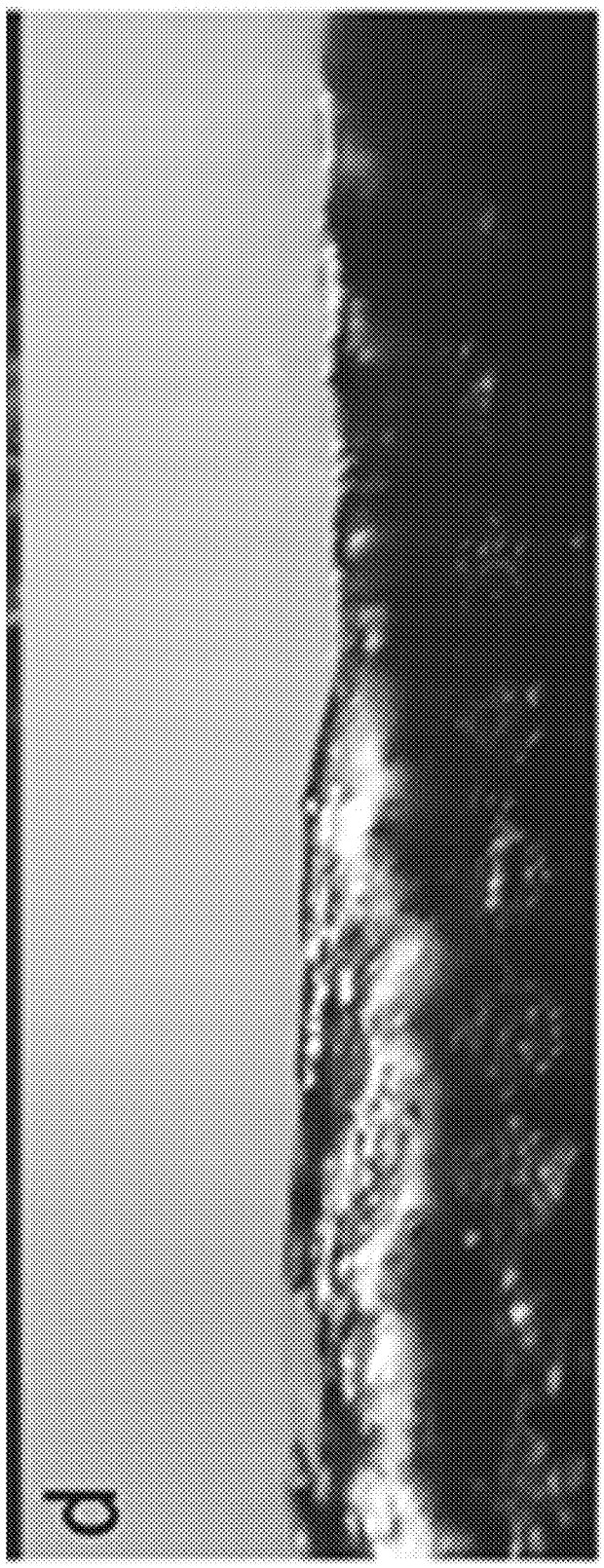
FIG. 4D illustrates a laser-treated sample surface in accordance with various exemplary embodiments

With reference now to FIG. 4A, a graph of the surface morphology of a control sample, created without using the laser healing apparatus, is shown. Also shown is an optical image of the surface in FIG. 4C. The wave-shape of the surface with a roughly 58 micrometer wave height is shown. With reference now to FIG. 4B, a graph of the surface morphology of a laser-treated sample is shown. Also shown is an optical image of the surface in FIG. 4D. The printing speed of the laser-treated sample was 2.5 millimeters per second, using 700 milliwatts of laser power.

Figure 5:
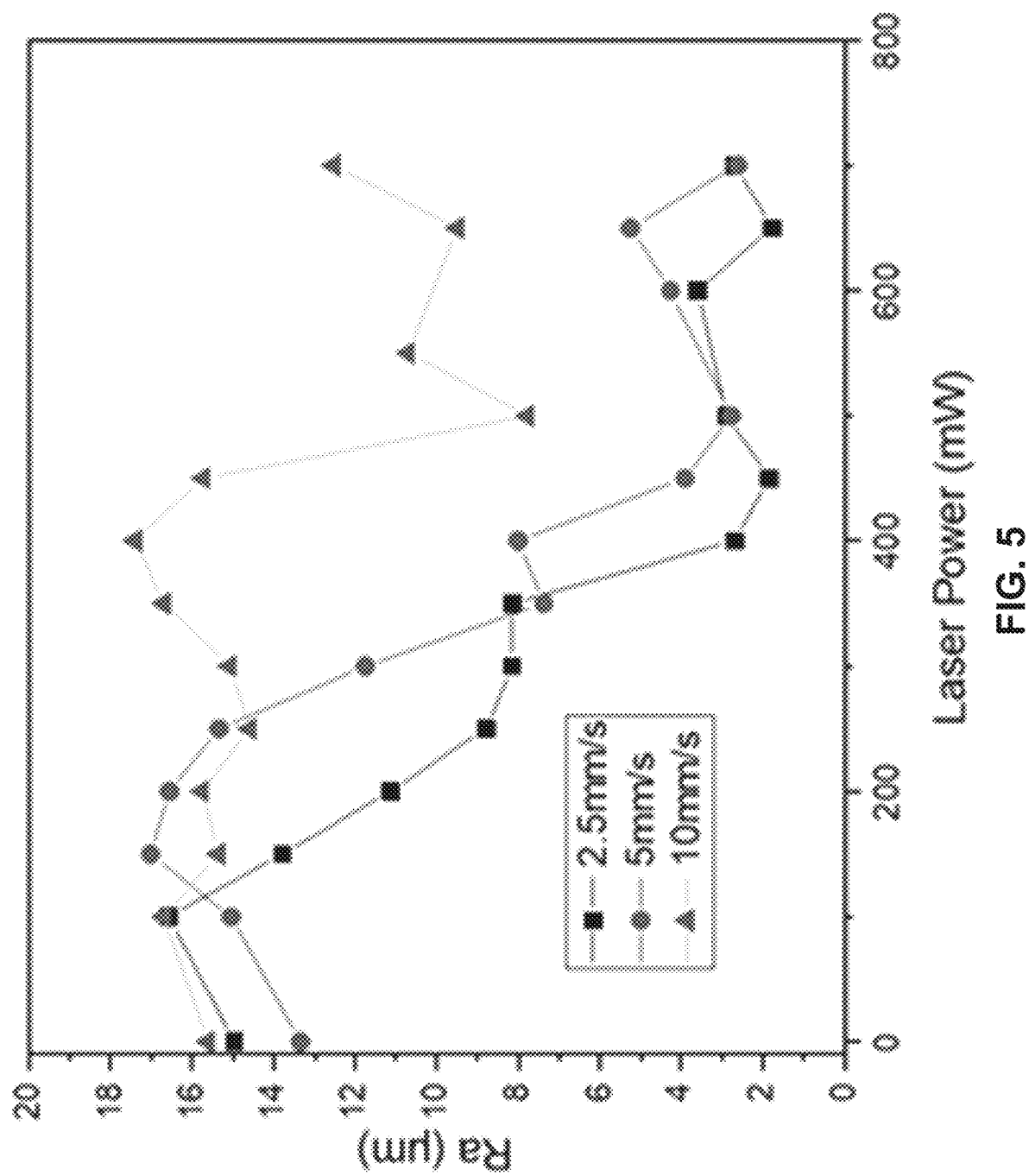
FIG. 5 illustrates a plot of surface roughness in accordance with various exemplary embodiments.

With reference now to FIG. 5, a plot of the roughness parameter (Ra) is shown at three printing speeds and fourteen laser powers. The laser powers may vary from 0 milliwatts to 700 milliwatts in 50 milliwatts increments.

Figure 6A:
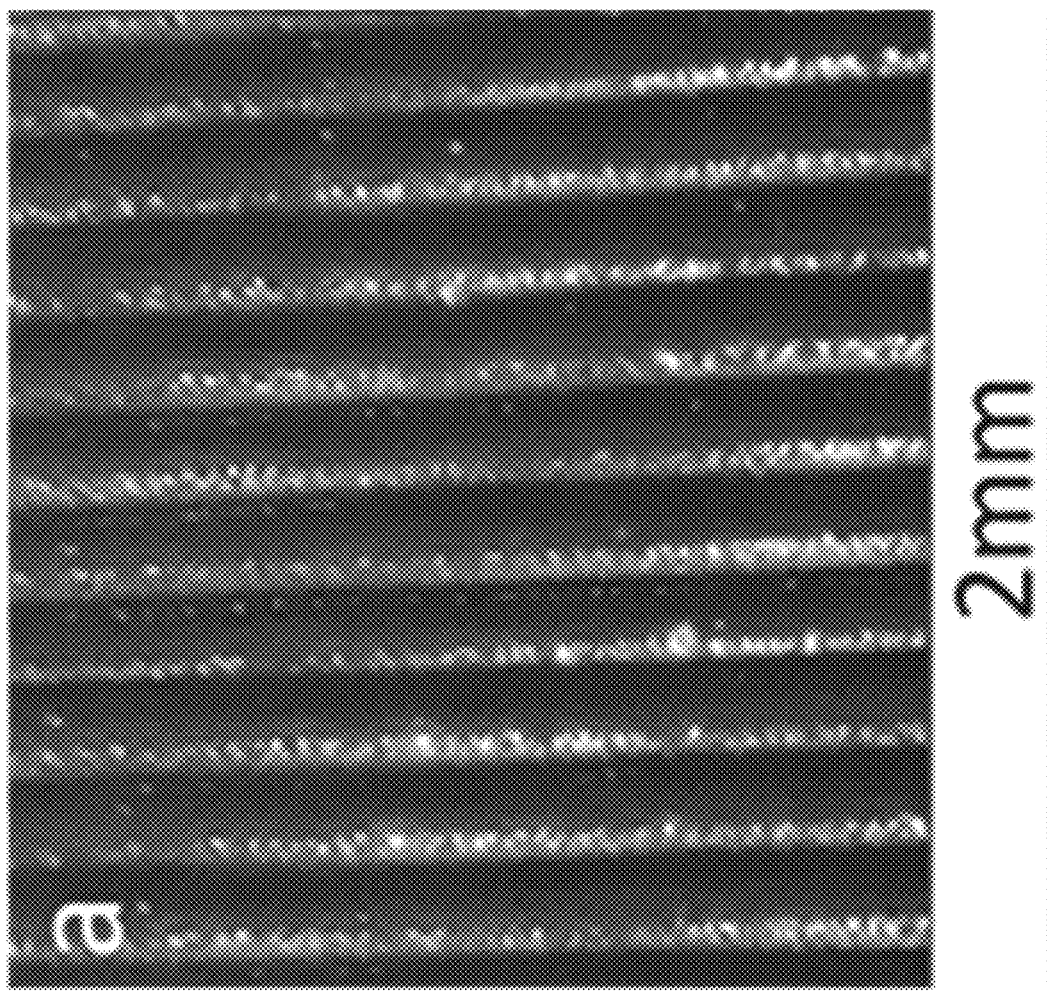
FIG. 6A illustrates an optical image of a control sample in accordance with various exemplary embodiments.
Figure 6B:
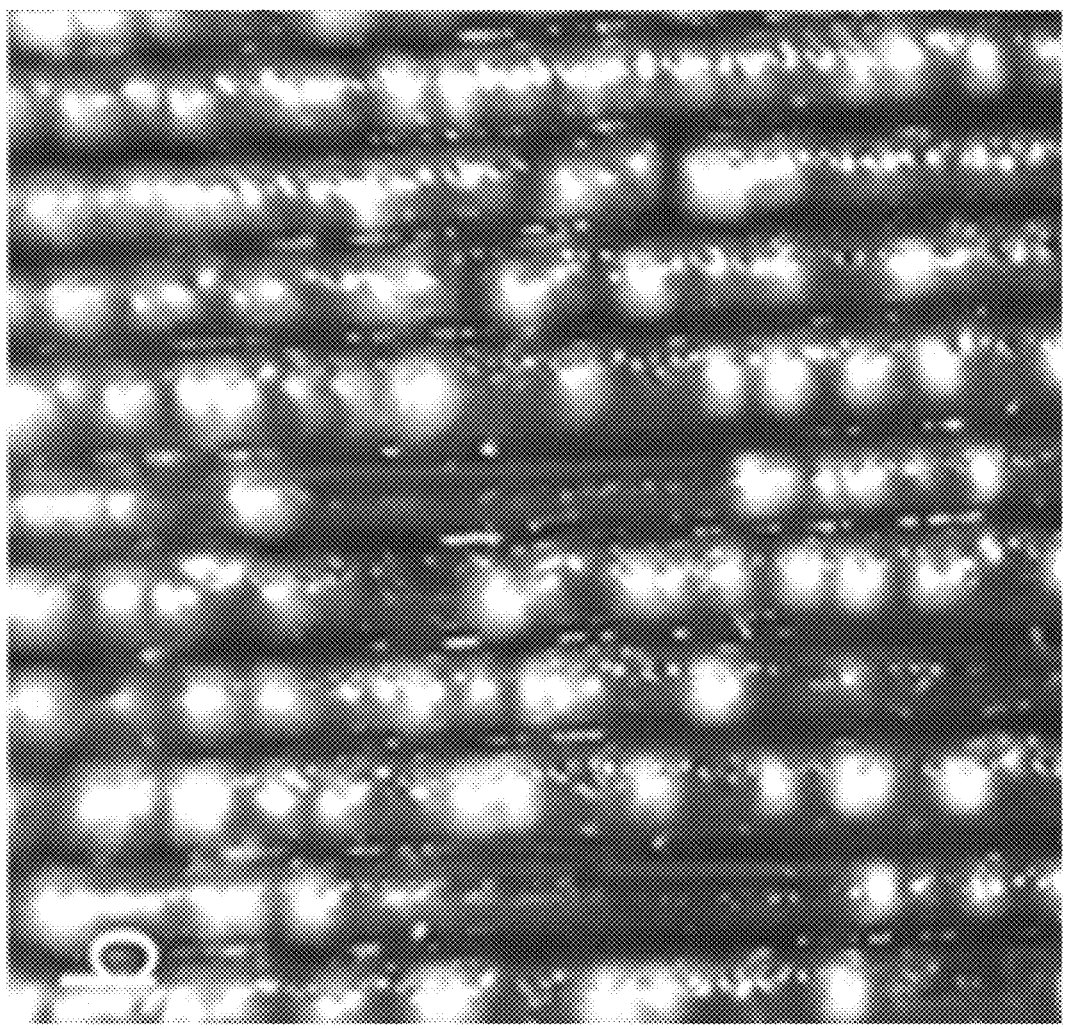
FIG. 6B illustrates an optical image of a laser-treated sample at 10 mm/s 450 mW in accordance with various exemplary embodiments.
Figure 6C:
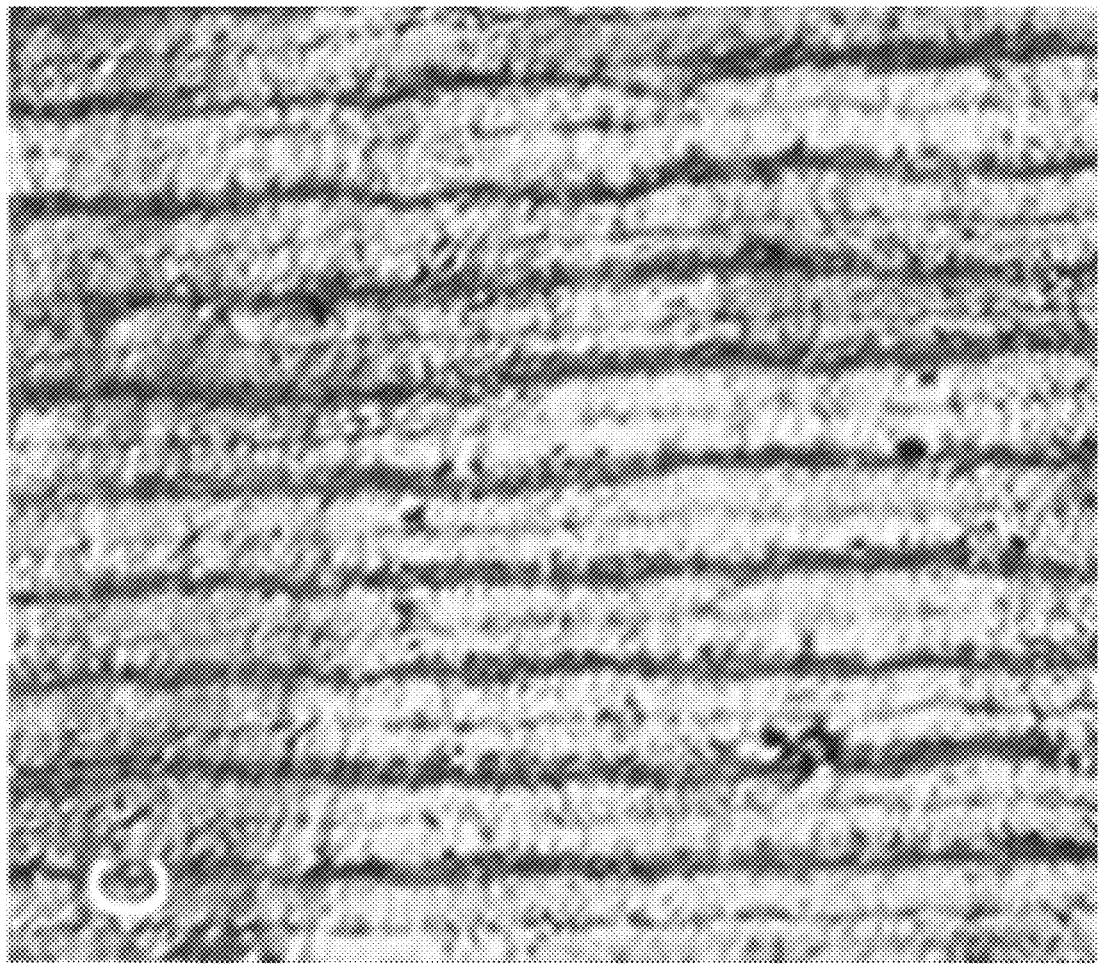
FIG. 6C illustrates an optical image of a laser-treated sample at 2.5 mm/s at 700 mW in accordance with various exemplary embodiments.

With reference now to FIGS. 6A, 6B, and 6C, optical images of various samples are shown. With reference now to FIG. 6A, an optical image of a control sample is shown, manufactured using FFF without laser treatment. With reference now to FIG. 6B, an optical image of a laser-treated sample is shown. The sample is treated at a laser power of 450 milliwatts and a printing speed of 10 millimeters per second, which is the minimum laser power at which surface healing is visible for that printing speed. With reference now to FIG. 6C, an optical image of a laser-treated sample is shown. The sample is treated at a laser power of 700 milliwatts with a printing speed of 2.5 millimeters per second. Gap shape regions between layers may be seen that have different optical behaviors.

Figure 7:
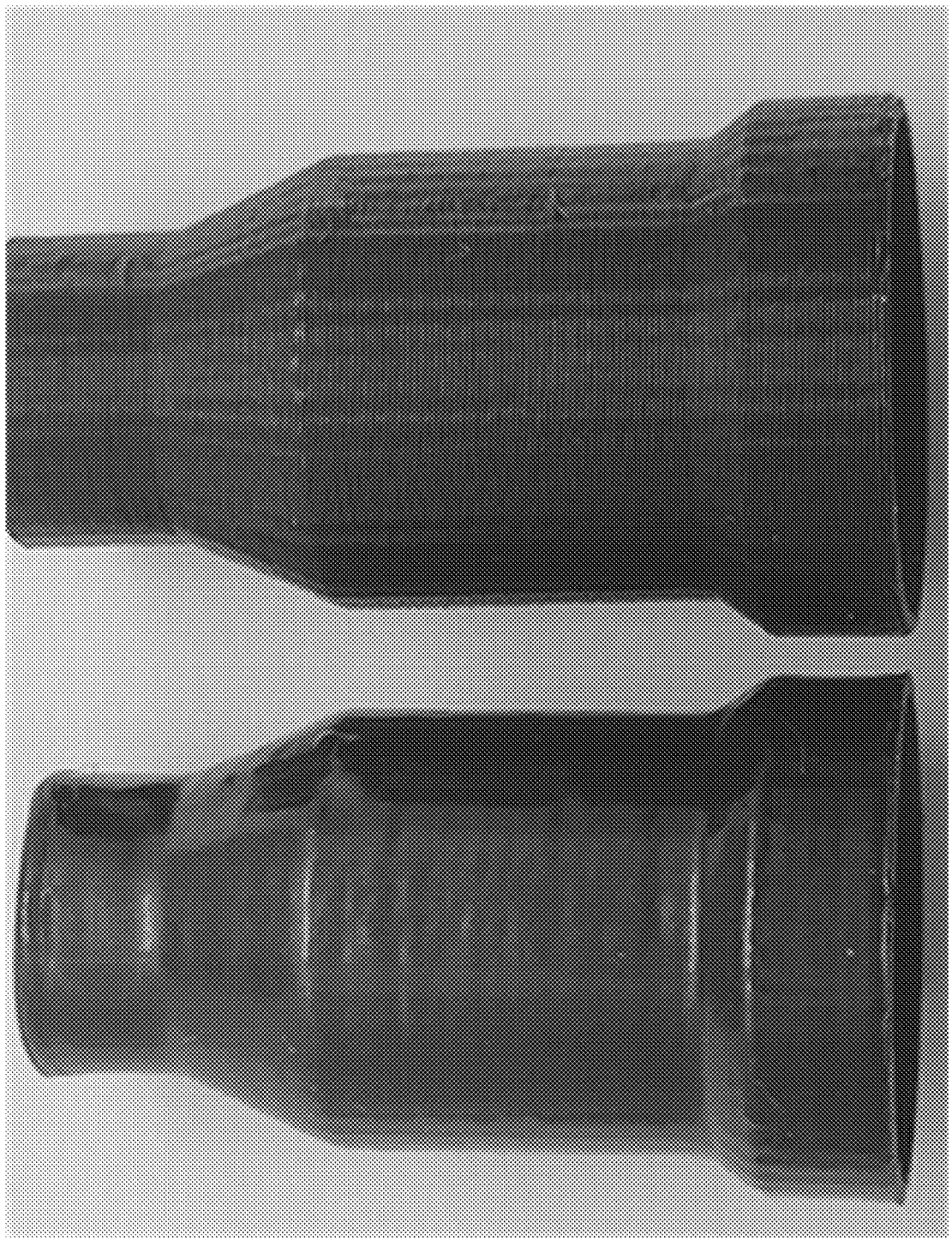
FIG. 7 illustrates an optical image of hose adapters, one with and one without laser treatment in accordance with various exemplary embodiments.

With reference now to FIG. 7, an optical image of printed hose adaptors is shown. On the left is a laser-treated sample, while on the right is a control sample without laser treatment. The enhanced surface texture of the laser-treated sample is visible.

Figure 8:
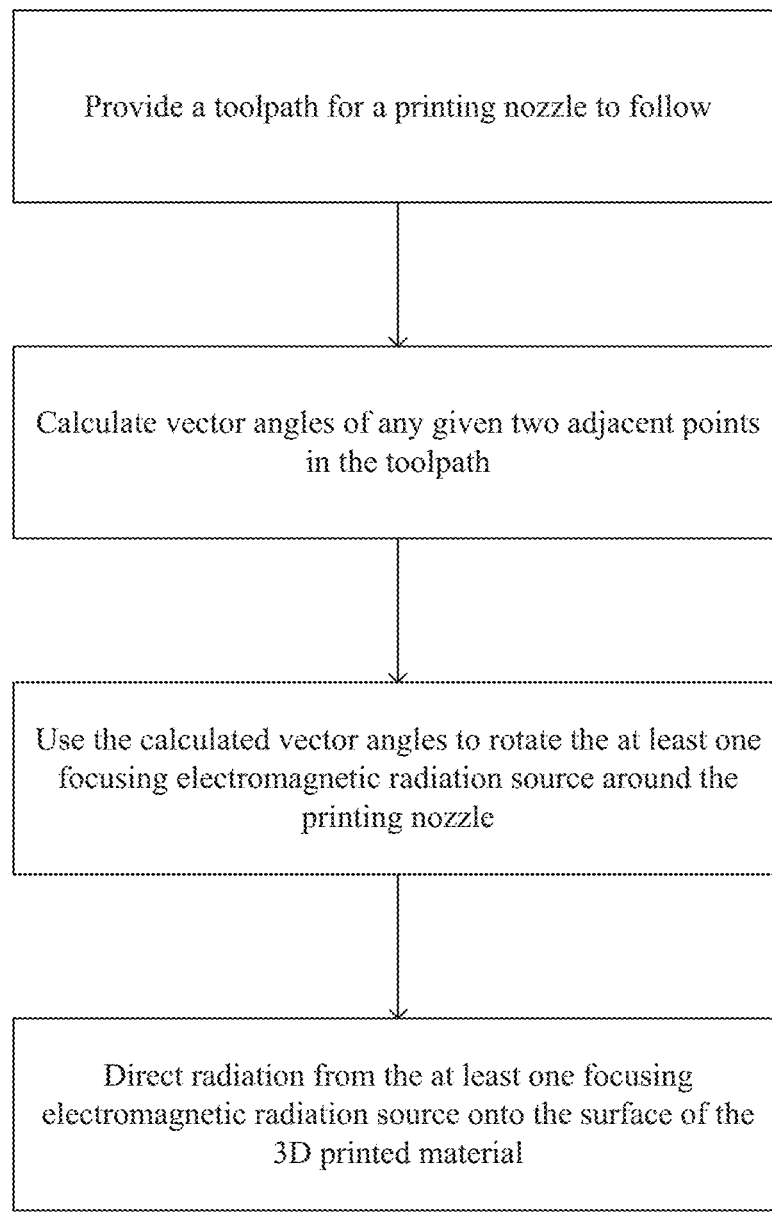
FIG. 8 illustrates a method of using at least one focusing electromagnetic radiation source to modify a 3D-printed material in accordance with various exemplary embodiments.

Referring now to FIG. 8, a method for modifying a 3D printed material is disclosed, wherein a focusing electromagnetic radiation source is used. First, a toolpath is provided to the 3D printer to communicate the desired part for printing. This toolpath may guide the printing nozzle to extrude the part by depositing layers of filament. Any two adjacent points on the toolpath may then be utilized to calculate the vector angles, which can then be communicated to the focusing electromagnetic radiation source that is coupled to the printing nozzle to rotate about the printing nozzle relative to the toolpath. The focusing electromagnetic radiation source may then direct radiation onto the surface of the 3D printed part as it is printed to improve interlayer adhesion of the filament.

Figure 9:
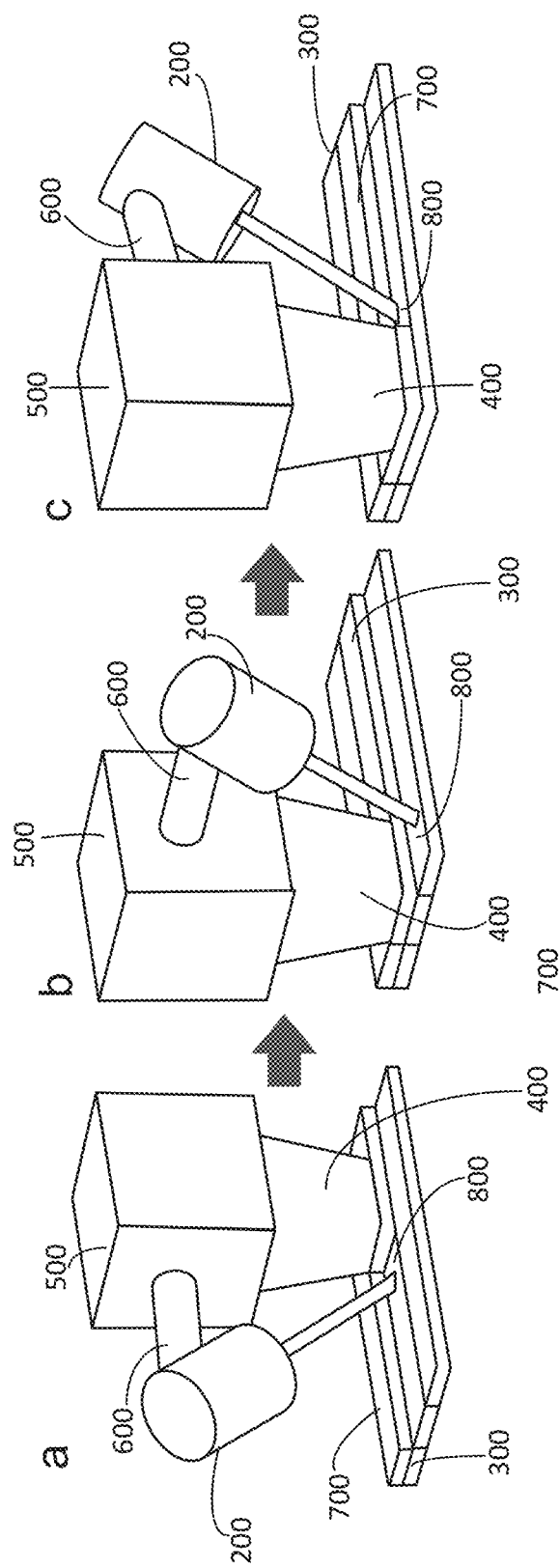
FIG. 9 illustrates a step-by-step schematic diagram of the healing process of a rotating laser healing apparatus as the printing nozzle extrudes filament, in accordance with various exemplary embodiments.

Referring now to FIG. 9, in various embodiments, the 3D printer may be a Type A Machine 3D Printer. A Duet 2 Wi-Fi motherboard may replace the original motherboard of the 3D printer to allow rotational control of the focusing electromagnetic radiation source 200. In various embodiments, the 3D printer may be controlled through an internet browser. A stepper motor may be installed on the printer using an L-shape bracket coupled to the hot end 500. The stepper motor may enable the hot end to orbit from 0° to 360° about the printing nozzle 400. In various embodiments, the focusing electromagnetic radiation source 200 may be installed on the hot end 500 with an elbow shape holder. In various embodiments, the hot end 500, focusing electromagnetic radiation source 200, and a brass gear are attached and move as a unit in orbit about the printing nozzle 400 during printing. In various embodiments, a slicing software may be used to slice the digital 3D model for printing into layers and creating a G-code toolpath. Then, a toolpath converter may be used to add rotation commands into the toolpath to instruct the focusing electromagnetic radiation source 200 to rotate when the printing nozzle 400 changes directions to begin a new layer of filament 300. In various embodiments, the focusing electromagnetic radiation source 200 will rotate each time the printing nozzle 400 changes direction, wherein the focusing electromagnetic radiation source 200 heats the previous filament layer 700 in front of the moving printing nozzle 400, as shown in position (a) Then, when the printing nozzle 400 reaches the end of the path for the filament layer 300, the focusing electromagnetic radiation source 200 rotates 90°, as in position (b), next the printing nozzle 400 moves to the path of the next filament layer, and the focusing electromagnetic radiation source 200 rotates another 90 degrees (as in position (c)) to again direct the laser target 800 to the filament path ahead of the printing nozzle 200 in the printing nozzle's 200 new direction of movement.

Figure 10:
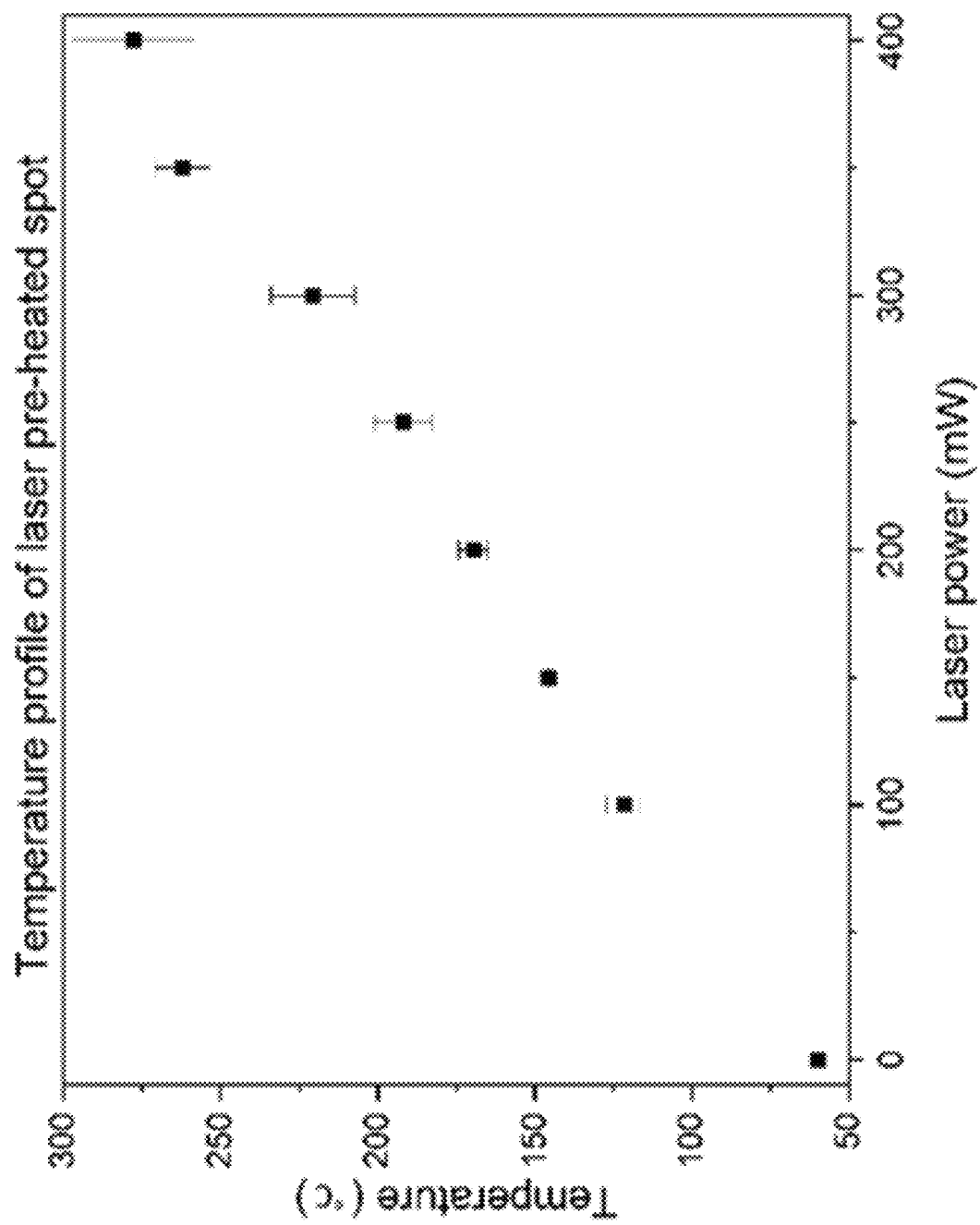
FIG. 10 illustrates the temperature profile of the laser pre-heated spot on the filament during printing in accordance with various exemplary embodiments.

Referring now to FIG. 10, the thermal profile of a spot on an extruded filament layer on which the laser is focused was measured using a thermal camera during the process of printing. The laser power was measured using a power meter. A thermal camera may be positioned on the front side of the build plate, at an angle of 37° above the build plate. The temperature was recorded by the thermal camera as the highest temperature measured for each level of laser power. FIG. 10 illustrates the correlation between laser power and temperature of the filament at the spot at which the laser was directed. The correlation between laser power and temperature is approximately linear, with the temperature increasing as the power of the laser increases.

Figure 11A:
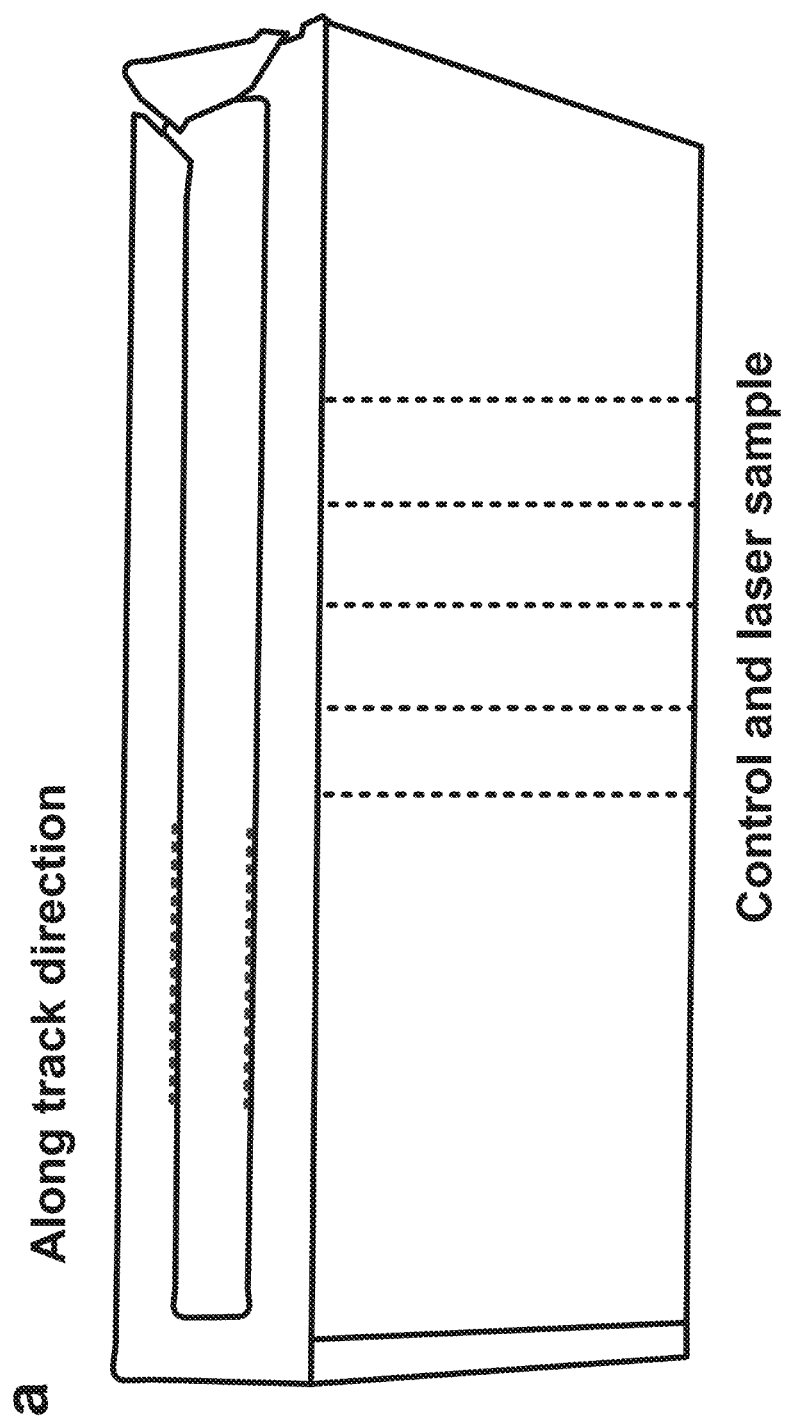
FIG. 11A illustrates a multi-wall rectangular box part manufactured with Black polylactic filament using a 0.8 mm E3D nozzle for extrusion, which was cut along a dashed line for conducting of a bending test, and another to test mechanical strength in a track direction in accordance with various exemplary embodiments.
Figure 11B:
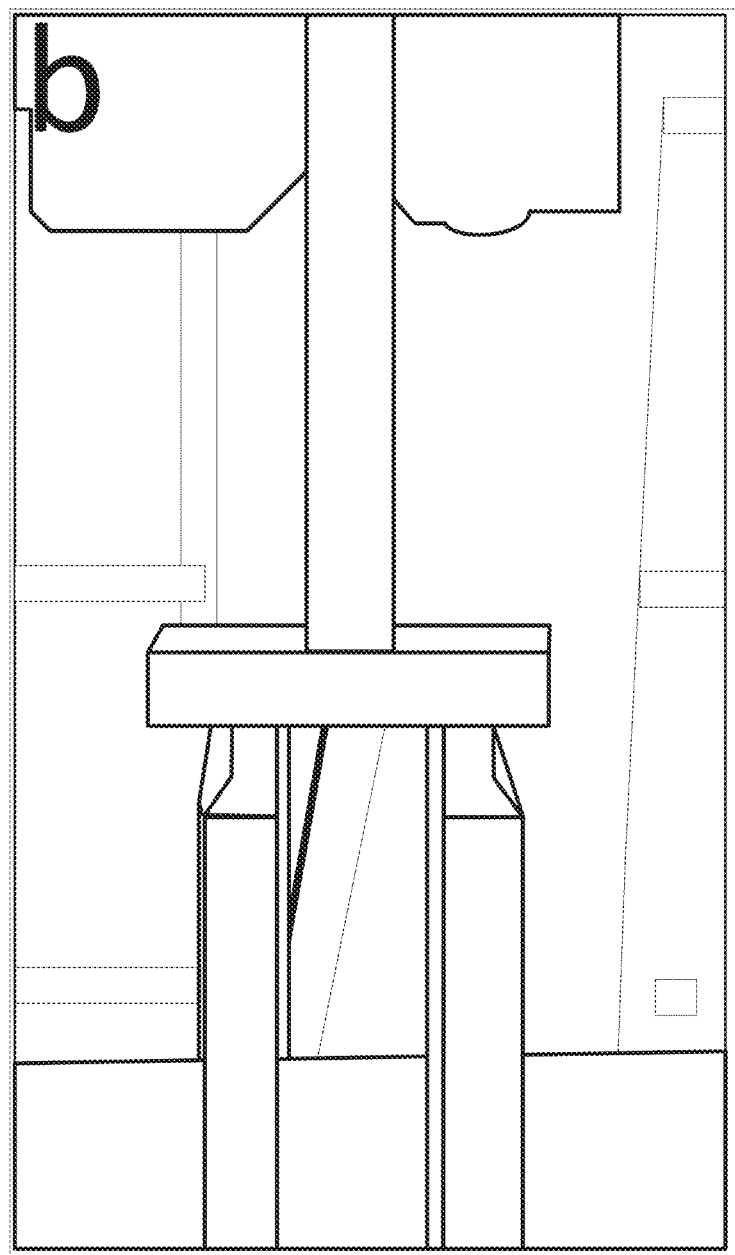
FIG. 11B illustrates a part manufactured using FFF with orbital laser healing being tested in a 3-point bending test machine in accordance with various exemplary embodiments.

Referring now to FIG. 11A and FIG. 11B, in various embodiments, black polylactic acid (PLA) filament may be used as the material to fabricate an FFF-manufactured sample. In various embodiments, the nozzle may be a 0.8 mm E3D nozzle. In various embodiments, the track deposited by the printing nozzle may be 1 mm wide and 0.2 mm thick. In various embodiments, the nozzle temperature may be 195° C. and the build plate temperature may be 60° C. The print speed of the printing nozzle may be 10 mm/s. A multi-wall rectangular box with no top and bottom, as shown in FIG. 11A, was constructed and cut using a diamond cutter in the direction of the dashed line. Seven samples were produced with dimensions of 20 mm long, 5 mm thick, and 4 mm wide, wherein one of the samples was manufactured without laser healing, and six of the samples were manufactured with laser healing, each with the laser set at different levels of intensity. The manufactured part of FIG. 11A was also cut to produce samples to test the mechanical strength in the direction parallel to the filament layers. A bending test was conducted on the samples using a testing apparatus 1110 as shown in FIG. 11B. A bending test was performed with a tensile testing machine, wherein four samples 1100 were individually tested for each laser setting and for the control group. The experiment also comprised a spare sample to replace abnormal or erroneous data. The load used for testing was 12 N and the pressing rate was 5 mm/min.

Figure 12:
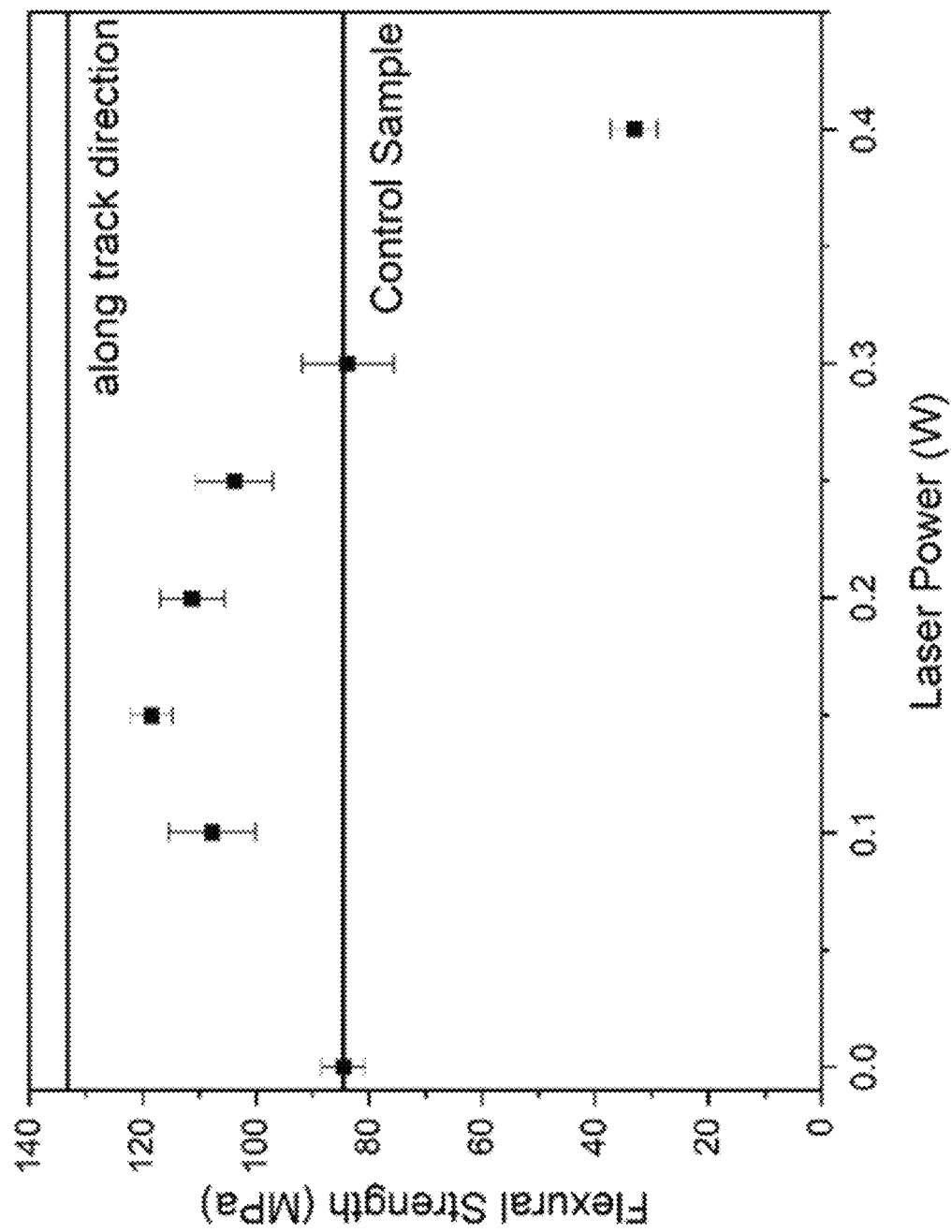
FIG. 12 illustrates the relationship between laser power of the focusing electromagnetic radiation source and the flexural strength of samples manufactured using FFF with orbital laser healing in accordance with various exemplary embodiments.

Referring now to FIG. 12, the flexural strength of a printed sample that has been laser-heated was tested for flexural strength when the laser was adjusted to various power levels, from 0 to 0.4 Watts. Two control sample groups were also tested, wherein the samples were printed parts but were not laser-treated using orbiting laser healing. One of the control sample groups was tested along the track direction, and the other was tested along the build direction. The control groups are indicated on the graph of FIG. 12 with two horizontal lines. These two lines indicate the flexural strength of the extruded material without laser healing in two directions. The orbital laser-heating sample was also tested using a laser of gradually increasing strength. FIG. 12 shows that the flexural strength gradually increased with the increasing strength of the laser until about 150 mW, then decreased from 150 mW to 400 mW. Thermal polymer reptation increases with increased laser power, which may enhance the interface bonding strength; however, polymer degradation also increases with the increasing laser power, which may reduce the mechanical strength. PLA, the polymer used in the experiment shown in FIG. 12, has a decomposition temperature of 215° C. The laser treated sample was observed with a flexural strength of 118.5 MPa when the laser was emitting at 150 mW of laser power. This experiment shows the potential of a 40% increase in flexural strength when the part is laser treated compared to the control sample and may allow the flexural strength to be up to 88.9% of the flexural strength of the samples tested along-track direction.

Figure 13:
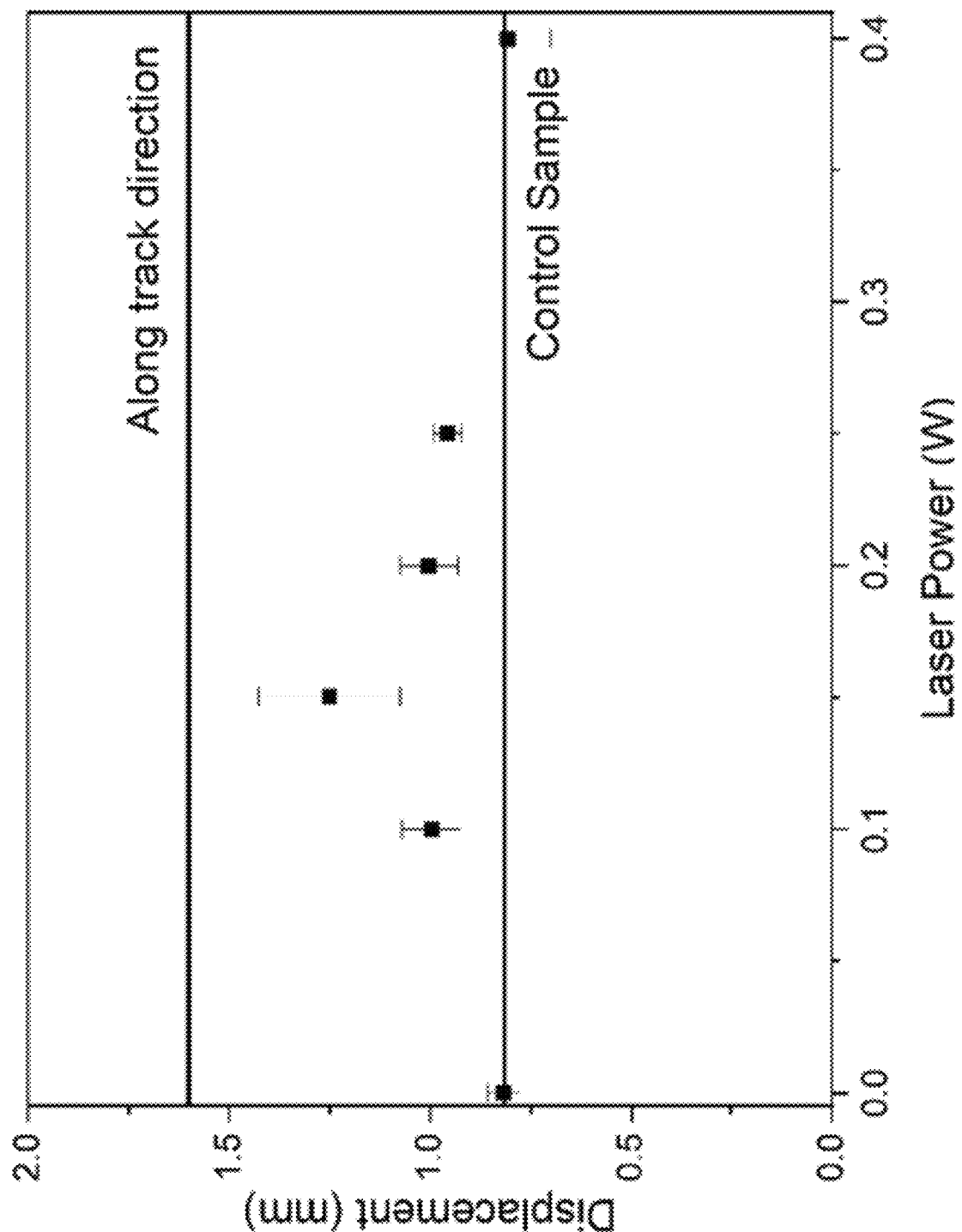
FIG. 13 illustrates the relationship between laser power of the focusing electromagnetic radiation source and displacement of samples manufactured using FFF with orbital laser healing before fracture of the sample occurred in accordance with various exemplary embodiments.

Referring now to FIG. 13, the correlation between displacement before fracture (ultimate strength) in millimeters of the samples and laser power is shown in a graphical format. The displacement increases as the power emitted from the laser increases until the laser power reaches 150 mW. After approximately 150 mW, the laser-heated sample's ultimate strength decreases. With laser treating, the displacement before fracture increased by 54.3% compared to control samples and reached 78.1% of samples tested along-track direction. This experiment shows that the orbiting laser healing process improves flexural strength and displacement before fracture when compared to parts not treated with the orbital laser healing process.

Figure 14A:
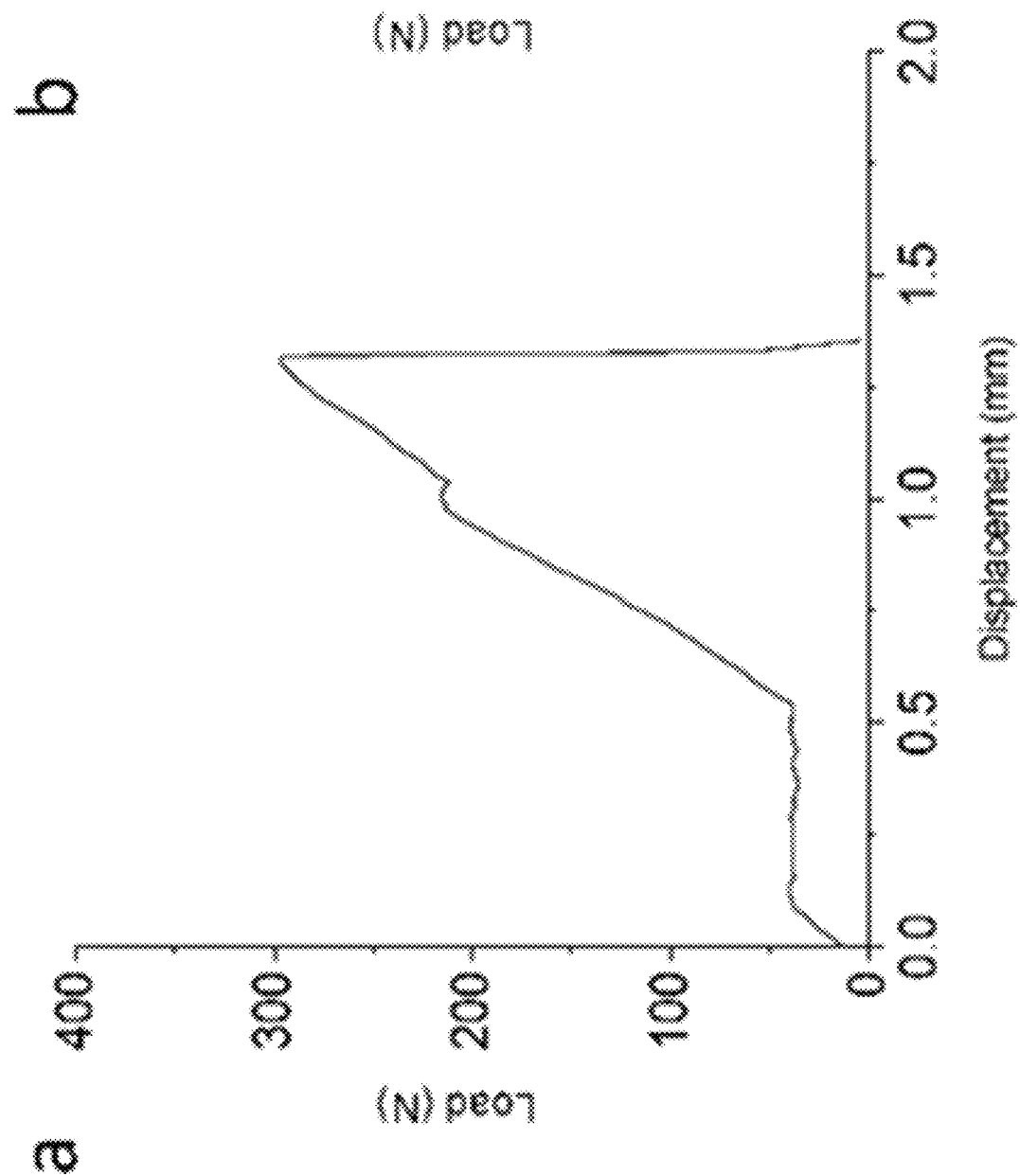
FIG. 14A illustrates the load-displacement curve of the control sample manufactured without orbital laser healing in accordance with various exemplary embodiments.
Figure 14B:
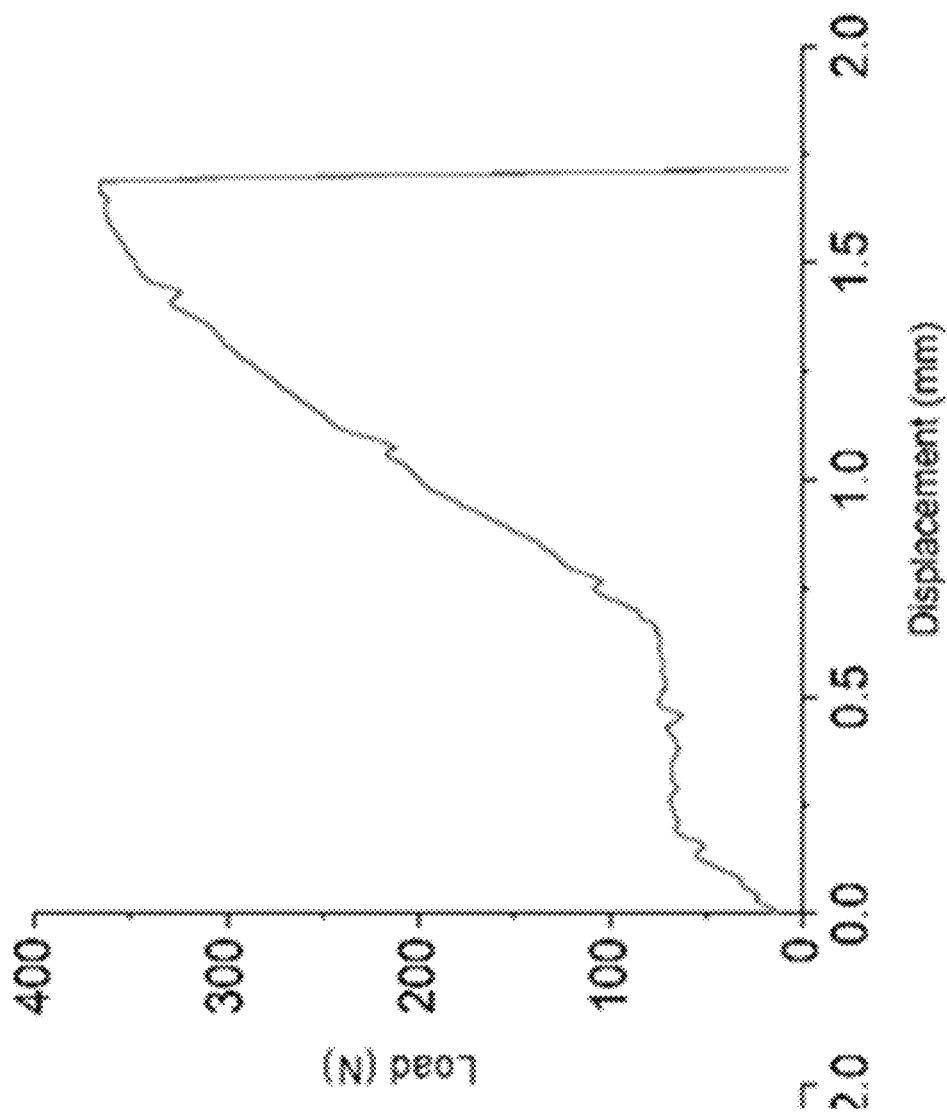
FIG. 14B illustrates the load-displacement curve of the sample manufactured using FFF with orbital laser healing wherein the laser emits 150 mW in accordance with various exemplary embodiments.

Referring now to FIGS. 14A and 14B, experimental evidence also shows that the orbiting laser process improves reptation between polymer layers and modifies the fracture mechanism from separating and pulling disentangled polymer chains to stretching and breaking entangled polymer chains. In FIGS. 14A and 14B, the segment between 0.1 mm and 0.6 mm is elastic due to sliding and is not counted in the displacement length. FIG. 14A illustrates the load-displacement curve of a control sample that was not treated with the orbital laser healing process. Where the displacement of the control sample is between 0.6 mm and 0.9 mm, the load increases linearly, demonstrated by the graph segment in this increment having a constant slope. At 0.9 mm displacement, the slope of the graph reaches a different constant value until it fractures at 1.3 mm. The deformation in these two linear regions is elastic. Thus, the sample fractured without much plastic deformation and the inter-layer interface of the control samples are not optimally bonded because the fracture does not result in excessive breakage of polymer chains FIG. 14B shows the load-displacement curve of a sample that has been treated with orbiting laser healing. In this curve, the slope decreases with an increase in displacement from 1.4 mm to fracture. The slope demonstrates that the sample may have plastic deformation and breakage of polymer chains, which may evidence that the orbiting laser process enhanced reptation between layers and altered the fracture mechanism from separating and pulling disentangled polymer chains into stretching and breaking entangled polymer chains.

Figure 15A:
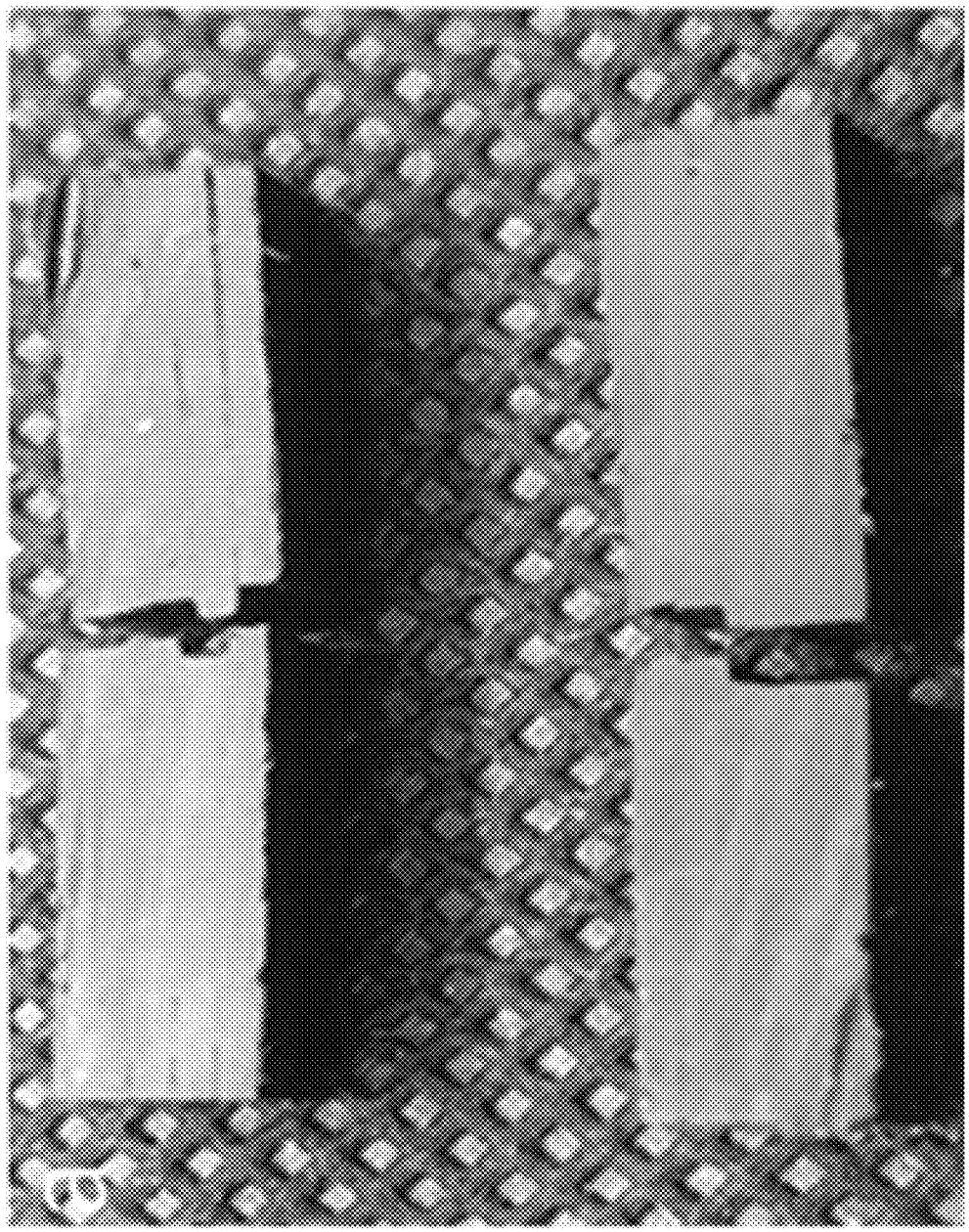
FIG. 15A illustrates the fracture of two control samples manufactured using FFF without orbital laser healing in accordance with various exemplary embodiments.
Figure 15B:
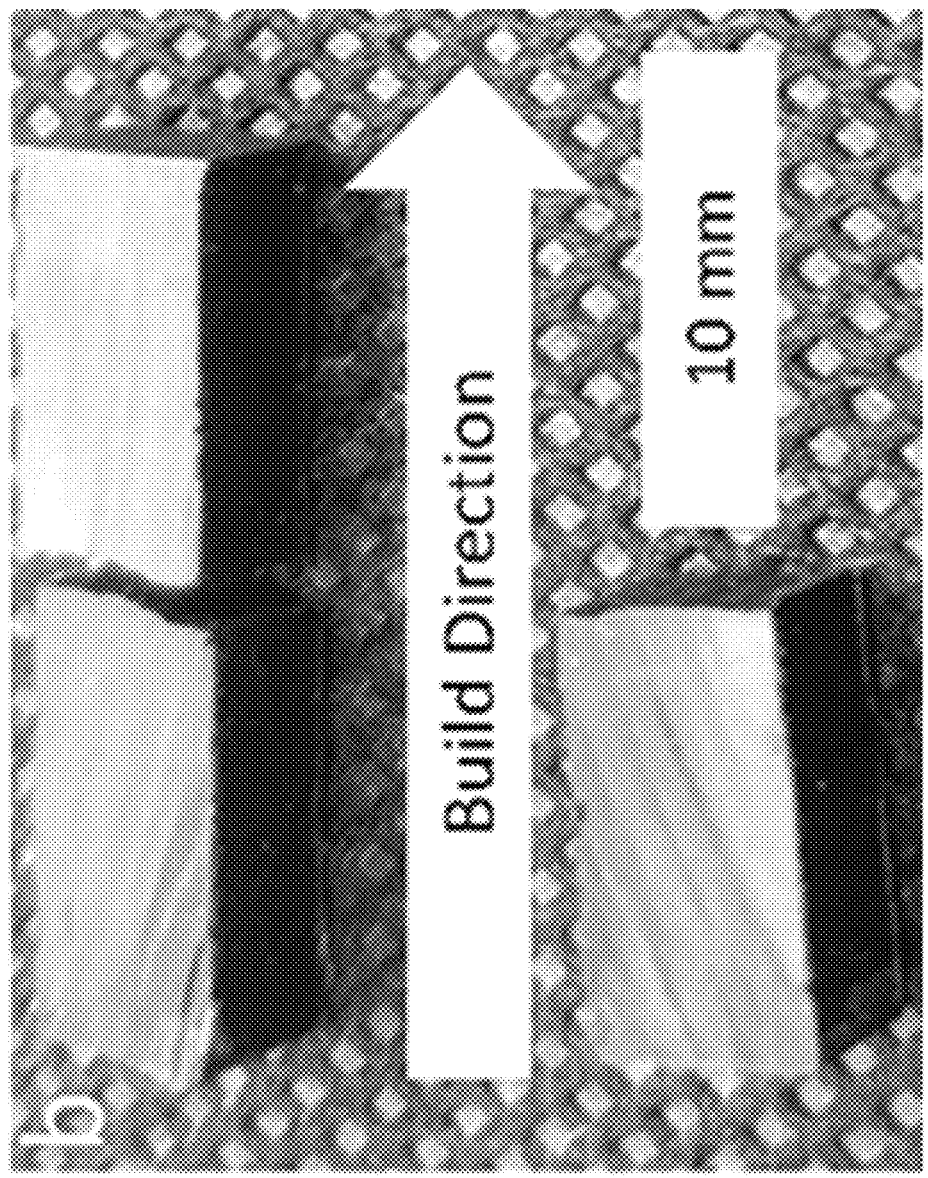
FIG. 15B illustrates the fracture of two samples manufactured using FFF with orbital laser healing in accordance with various exemplary embodiments.

Referring now to FIGS. 15A and 15B, samples after being subjected to flexural testing along the build direction are shown to illustrate the impact of laser healing on the fracture texture of the samples. FIG. 15A shows a fractured plane along the build direction of control samples, which represents the interface between adjacent tracks of polymer. This fracture texture happened due to the distribution of tension and compression within the sample during the flexural test, wherein the lower region of the sample experienced tension while the upper region experienced compression. The fracture texture demonstrates that the fracture between adjacent tracks happened before the fracture between the inter-layer interface, thus there is a re-distribution of force within the sample (which is graphically demonstrated in FIG. 14A with the change in slope of the load-displacement curve at 0.9 mm) followed by another elastic deformation, before the final fracture. FIG. 15B shows the fracture texture of the sample treated with the orbiting laser (at 150 mW) that has been subjected to a flexural test, wherein the fracture plane broke in layers, demonstrating the enhanced bonding between layers and healing of bonding between adjacent tracks.

Figure 16A:
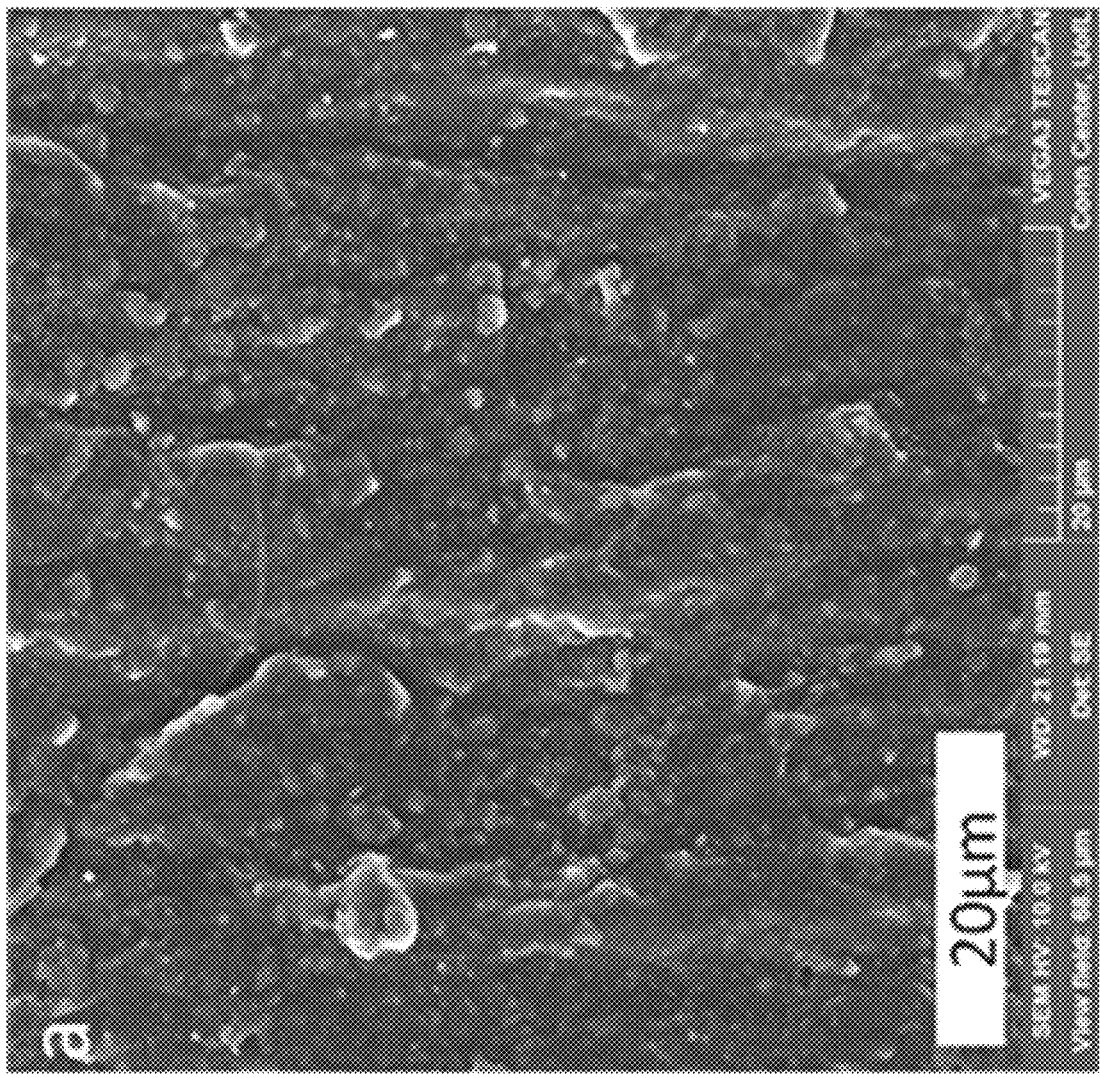
FIG. 16A illustrates a scanning electron microscope (SEM) image of the fracture surface of the control sample manufactured using FFF without orbital laser healing in accordance with various exemplary embodiments.
Figure 16B:
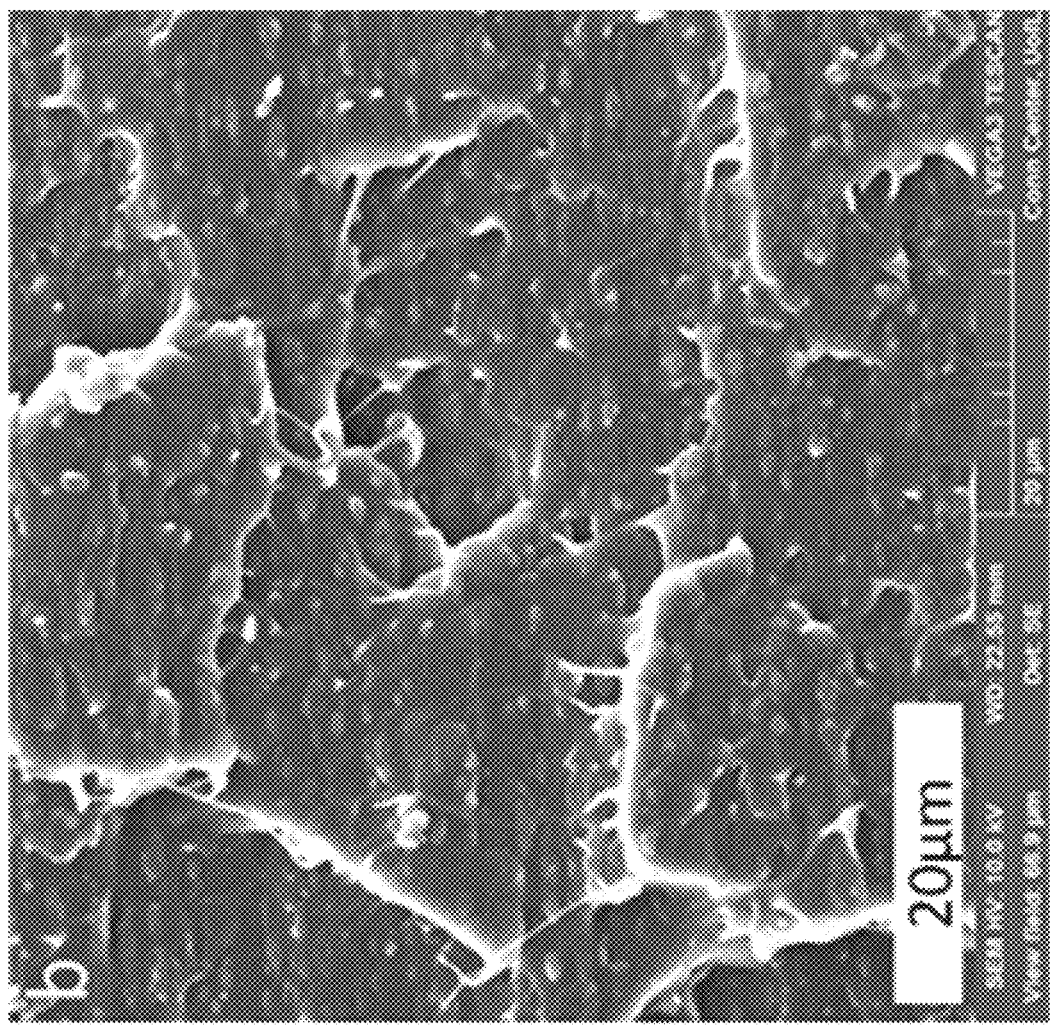
FIG. 16B illustrates a scanning electron microscope (SEM) image of the fracture surface of the sample manufactured using FFF with orbital laser healing with laser power of 150 mW in accordance with various exemplary embodiments.

Referring now to FIGS. 16A and 16B, SEM imaging illustrates in greater detail the fracture behavior of the laser-treated and non-laser-treated samples (control samples) after a flexural test. FIG. 16A is a microfracture surface image for a control sample, wherein there is no visible plastic deformation in the fracture surface. FIG. 16B is a microfracture surface image for the sample that was treated with orbital laser healing, which shows "peeling-off" and "pulling-out" features, demonstrating the stretching and breaking of polymer chains that may be facilitated by the increased reptation caused by laser healing.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all of the claims.

As used herein, the terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C: (4) at least one of A and at least one of B; (5) at least one of B and at least one of C; (6) at least one of A and at least one of C, or (7) at least one of A, at least one of B, and at least one of C.

What is claimed is:

1. A 3D printing apparatus, comprising:
    a printing nozzle comprising a nozzle orifice, an input end, and a hot end;
    a focusing electromagnetic radiation source configured to orbit around the printing nozzle;
    a processor configured with instructions that, when executed by the processor, cause the focusing electromagnetic radiation source to orbit around the printing nozzle;
    a tube coupled to the hot end of the printing nozzle and to the input end to allow the flow of filament into the nozzle orifice; and
    an orbiting mechanism coupled to the focusing electromagnetic radiation source,
    wherein the processor enables the orbiting mechanism to move the focusing electromagnetic radiation source in an orbital path around the printing nozzle,
    wherein the printing nozzle is coupled to a wire bundle comprising the tube, a laser cable, a heater cable, and a thermistor cable, and
    wherein the wire bundle is configured to allow rotation.

2. The apparatus of claim 1, wherein the processor is configured to enable two-dimensional rotational control of the electromagnetic radiation source.

3. The apparatus of claim 1, wherein the focusing electromagnetic radiation source emits 100 to 200 mW of electromagnetic radiation when activated.

4. The apparatus of claim 1, further comprising a second focusing electromagnetic radiation source coupled to a second orbiting mechanism.

5. The apparatus of claim 1, wherein the focusing electromagnetic radiation source is a diode laser.

6. The apparatus of claim 1, wherein the hot end and electromagnetic radiation source is configured to orbit from 0 to 360 degrees about the printing nozzle.

7. A method of using at least one focusing electromagnetic radiation source to modify a 3D-printed material, the method comprising:
    providing a toolpath for a printing nozzle to follow;
    calculating vector angles of any given two adjacent points in the toolpath;
    using the calculated vector angles to rotate the at least one focusing electromagnetic radiation source around the printing nozzle; and
    directing radiation from the at least one focusing electromagnetic radiation source onto the 3D printed material.

8. The method of claim 7, wherein the method further comprises directing the at least one focusing electromagnetic radiation source to the surface of the 3D-printed material to heat a layer of the 3D-printed material as the subsequent layer of filament is extruded to increase interlayer adhesion.

9. The method of claim 7, wherein the method further comprises inputting a computer-aided drafting (CAD) model to generate the toolpath for the printing nozzle to follow.

10. The method of claim 7, wherein the printing nozzle comprises an input end and a hot end, and a filament is fed into the input end of the printing nozzle.

11. The method of claim 7, wherein the printing nozzle further comprises a tube connecting the input end and the hot end, wherein the tube comprises two rollers which are configured to translate the filament along a length of the tube towards the hot end of the printing nozzle.

12. The method of claim 7, wherein the at least one focusing electromagnetic radiation source is configured to orbit the printing nozzle at any relative angle from 0 degrees to 360 degrees.

13. The method of claim 7, wherein a focal point of the at least one focusing electromagnetic radiation source is rectangular in shape.

\* \* \* \* \*